US012764805B2

(12) United States Patent
Wódczak

(10) Patent No.: US 12,764,805 B2
(45) Date of Patent: Oct. 13, 2026

(54) METHOD AND APPARATUS FOR SUPPORTING AN EXTENDED ACCESS POINT IN A WIRELESS COMMUNICATION SYSTEM

(71) Applicant: Samsung Electronics Co., Ltd., Suwon-si (KR)

(72) Inventor: Michał Wódczak, Warsaw (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 329 days.

(21) Appl. No.: 18/498,896

(22) Filed: Oct. 31, 2023

(65) Prior Publication Data

US 2024/0098809 A1 Mar. 21, 2024

Related U.S. Application Data

(63) Continuation of application No. PCT/KR2023/012341, filed on Aug. 21, 2023.

(30) Foreign Application Priority Data

Sep. 21, 2022 (KR) ........................ 10-2022-0119300

(51) Int. Cl.
*H04W 76/10* (2018.01)
*H04W 48/16* (2009.01)
*H04W 48/20* (2009.01)

(52) U.S. Cl.
CPC ........... *H04W 76/10* (2018.02); *H04W 48/16* (2013.01); *H04W 48/20* (2013.01)

(58) Field of Classification Search
CPC ...... H04W 76/10; H04W 48/16; H04W 48/20
(Continued)

(56) References Cited

U.S. PATENT DOCUMENTS 11,240,712 B2 2/2022 Xiong
12,267,738 B2 * 4/2025 Li ..................... H04W 36/0005
(Continued)

FOREIGN PATENT DOCUMENTS

CN 110383787 9/2021
KR 10-2022-0030277 3/2022
(Continued)

OTHER PUBLICATIONS

Search Report dated Nov. 29, 2023 in International Patent Application No. PCT/KR2023/012341 and English-language translation.
(Continued)

*Primary Examiner* — Chi Tang P Cheng
*Assistant Examiner* — Michael Wayne Maddox
(74) *Attorney, Agent, or Firm* — Nixon & Vanderhye, P.C.

(57) ABSTRACT

The disclosure relates to a 5G or 6G communication system for supporting a higher data transmission rate. An example method performed by an access and mobility management function (AMF) node in a wireless communication system may include receiving extended access point (EAP) capability related information from an EAP, performing control plane expansion to include the EAP, based on the received EAP capability related information, creating an X2 interface with the AMF node and the EAP based on a number of relevant base stations, instructing the base station to establish an X2 interface with the EAP based on the created X2 interface, and instructing the EAP to establish a connection with a terminal.

20 Claims, 14 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2020/0008173 | A1 | 1/2020 | Kim et al. | |
| 2020/0015295 | A1* | 1/2020 | Stauffer ................ | H04W 76/12 |
| 2020/0068440 | A1* | 2/2020 | Talbert .................. | H04W 28/16 |
| 2020/0100088 | A1 | 3/2020 | Lee | |
| 2022/0188211 | A1 | 6/2022 | Gupta et al. | |
| 2022/0369215 | A1 | 11/2022 | Dees et al. | |
| 2023/0199465 | A1* | 6/2023 | Jain ....................... | H04W 8/005 455/435.1 |
| 2023/0336966 | A1 | 10/2023 | Wodczak | |

FOREIGN PATENT DOCUMENTS

| | | | |
|---|---|---|---|
| KR | 10-2022-0096875 | | 7/2022 |
| WO | 2022/042264 | | 3/2022 |
| WO | 2022145837 | A1 | 7/2022 |
| WO | 2022220376 | A1 | 10/2022 |

OTHER PUBLICATIONS

Written Opinion dated Nov. 29, 2023 in International Patent Application No. PCT/KR2023/012341 and English-language translation.
Arzo, Sisay Tadesse et al., “Multi-Agent-Based Traffic Prediction and Traffic Classification for Autonomic Network Management Systems for Future Networks,” Future Internet 2022, 14, 230, https://doi.org/10.3390/fi14080230, Jul. 28, 2022, 24 pages.
3GPP TR 22.866 V17.1.0, 3rd Generation Partnership Project; Technical Specification Group Services and System Aspects; enhanced Relays for Energy Efficiency and Extensive Coverage; Stage 1 (Release 17), Dec. 20, 2019, 45 pages.
Kim et al., 3GPP SA2 architecture and functions for 5G mobile communication system, Online: https://www.sciencedirect.com/science/article/pii/S240595951730019X, Mar. 2017, pp. 1-8, vol. 3, Iss. 1, ICT Express, Science Direct.
MCPTT Interoperability: Results and Future Projects, Webinar, ETSI, TCCA, Nov. 16, 2017, 42 pages.
MCPTX for PS-LTE Benefits of a Standards-based Implementation, Technical Report, 2019, 12 pages, Samsung.
SDR# TETRA Plugin Now Available At Rtlsdr. Ru, Online: https://www.rtl-sdr.com/sdr-tetra-plugin-now-available-at-rtl-sdr-ru/, Jan. 24, 2019, 2 pages.

* cited by examiner

METHOD AND APPARATUS FOR SUPPORTING AN EXTENDED ACCESS POINT IN A WIRELESS COMMUNICATION SYSTEM

CROSS-REFERENCE TO RELATED APPLICATIONS

This application is a continuation of International Application No. PCT/KR2023/012341, filed Aug. 21, 2023, in the Korean Intellectual Property Receiving Office, which is based on and claims priority to Korean Patent Application No. 10-2022-0119300, filed Sep. 21, 2022, in the Korean Intellectual Property Office. The disclosures of each of these applications are incorporated by reference herein in their entireties.

BACKGROUND

Field

The disclosure generally relates to a wireless communication system, and more particularly, to a method and an apparatus for supporting an extended access point.

Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is planned in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Based on a 5G non-stand-alone (NSA) option, a public safety (PS)-long term evolution (LTE) communication scheme may be used without having to deploy a hybrid 5G/LTE base station which requires an excessive cost all over the network. What is demanded is a management solution for efficiently supporting an extended access point (EAP) based on a recent access scheme for emergency communication such as PS-LTE.

SUMMARY

Based on the discussions described above, embodiments of the present disclosure provide an apparatus and a method for effectively providing a service in a wireless communication system.

More specifically, embodiments of the disclosure provide an apparatus and a method for efficiently supporting an extended access point allowing an international mobile subscriber identity (IMSI)/individual tetra subscriber identity (ITSI) compliant terminal via a virtual radio interface.

According to various example embodiments of the present disclosure, a method performed by an access and mobility management function (AMF) node, in a wireless communication system, may include receiving extended access point (EAP) capability related information from an EAP, performing control plane expansion to include the EAP, based on the received EAP capability related information, creating an X2 interface with the AMF node and the EAP based on a number of relevant base stations, instructing a base station to establish an X2 interface with the EAP based on the created X2 interface, and instructing the EAP to establish a connection with a terminal.

According to various example embodiments of the present disclosure, a method performed by an EAP, in a wireless communication system, may include transmitting EAP capability related information to an AMF node, determining capability for servicing a terminal based on the EAP capability related information, determining whether to activate a software defined radio (SDR)-modulation & coding translation (MCT) function to perform modulation or demodulation in software based on the EAP capability related information, establishing an X2 interface with a base station connected to the AMF node, establishing a logical interface with another EAP in coverage of the base station, and establishing a connection with the terminal based on an instruction of the AMF node.

According to various example embodiments of the present disclosure, an AMF node, in a wireless communication system, may include at least one transceiver, and at least one processor functionally coupled with the at least one transceiver, and the at least one processor may be configured to receive EAP capability related information from an EAP, perform control plane expansion to include the EAP, based on the received EAP capability related information, create an X2 interface with the AMF node and the EAP based on a number of relevant base stations, instruct a base station to establish the X2 interface with the EAP based on the created X2 interface, and instruct the EAP to establish a connection with a terminal.

According to various example embodiments of the present disclosure, an EAP in a wireless communication system may include at least one transceiver, and at least one processor functionally coupled with the at least one transceiver, and the at least one processor may be configured to transmit EAP capability related information to an AMF node, determine capability for servicing a terminal based on the EAP capability related information, determine whether to activate a SDR-MCT function to perform modulation or demodulation in software based on the EAP capability related information, establish an X2 interface with a base station connected to the AMF node, establish a logical interface with another EAP in coverage of the base station, and establish a connection with the terminal based on an instruction of the AMF node.

The present disclosure provides an apparatus and a method for effectively providing a service in a wireless communication system.

Effects obtainable from the present disclosure are not limited to the effects mentioned in various embodiments, and other effects which are not mentioned may be clearly understood through the following descriptions.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
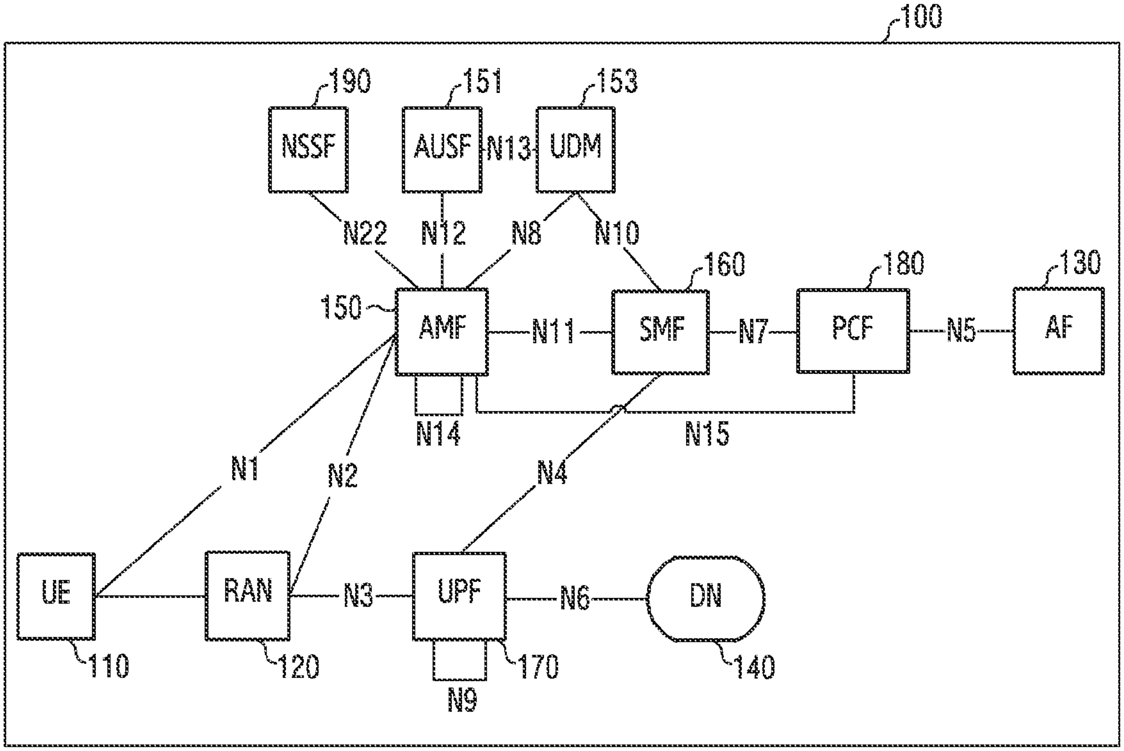
FIG. 1 illustrates an example communication network including core network entities in a wireless communication system according to various embodiments.

Terms used in the present disclosure are used merely to describe specific example embodiments, and are not intended to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the present disclosure. Among the terms used in the present disclosure, terms defined in a general dictionary may be interpreted as having the same or similar meanings as those in the context of the related art, and unless explicitly defined in the present disclosure, should not be interpreted as ideal or excessively formal meanings. In some cases, even terms defined in the present disclosure should not be interpreted to exclude embodiments of the present disclosure.

A hardware-based approach will be described as an example in various example embodiments of the present disclosure to be described hereafter. However, various embodiments of the present disclosure include technology which uses both hardware and software, and accordingly various embodiments of the present disclosure do not exclude a software-based approach. In addition, terms indicating network entities, and terms indicating components of a device used in the following explanation are illustrated for convenience of description. Accordingly, the present disclosure is not limited to the terms to be described, and other terms having the same technical meaning may be used.

Terms indicating parameters related to data display (e.g., a target entity, a data time interval, a resource level, a data type level), terms indicating network entities, terms indicating components of a device (modified appropriately according to the disclosure), and the like used in the following description are illustrated for convenience of description. Hence, the present disclosure is not limited to the following terms, and other terms having equivalent technical meanings may be used instead.

In addition, the present disclosure describes various embodiments using terms used in some communication standards (e.g., 3rd generation partnership project (3GPP)), but this is only an example for description. Various embodiments of the present disclosure may be easily modified and applied in other communication systems.

The following technology may be used in various wireless access systems including code division multiple access (CDMA), frequency division multiple access (FDMA), time division multiple access (TDMA), orthogonal frequency division multiple access (OFDMA), single carrier (SC)-FDMA, and the like. CDMA may be implemented as radio technology such as universal terrestrial radio access (UTRA) or CDMA2000. TDMA may be implemented as radio technology such as global system for mobile communications (GSM), general packet radio service (GPRS) or enhanced data rates for GSM evolution (EDGE). OFDMA may be implemented as radio technology such as institute of electrical and electronics engineers (IEEE) 802.11 (i.e., Wi-Fi), IEEE 802.16 (i.e., WiMAX), IEEE 802.20, evolved UTRA (E-UTRA), or the like. For clarity of description, the technical spirit of the present disclosure is described based on the 3GPP new radio (NR) but the technical spirit of the present disclosure is not limited to thereto.

Also, in the present disclosure, to determine whether a specific condition is satisfied or fulfilled, expressions such as greater than or less than are used but are merely an expression by way of example and do not exclude expressions of equal to or greater than or equal to or less than. A condition expressed as 'greater than or equal to' may be replaced by 'greater than', a condition expressed as 'less than or equal to' may be replaced by 'less than', and a condition expressed as 'greater than or equal to and less than' may be replaced by 'greater than and less than or equal to'.

Terms for indicating signals, terms for indicating channels, terms for indicating control information, terms for indicating network entities, and terms for indicating device components used in the following explanation are illustrated for convenience of explanation. Accordingly, the present disclosure is not limited to the following terms, and may use other terms having the same technical meaning.

Example embodiments of the present disclosure relate to an apparatus and a method for supporting an extended access point (EAP) in a wireless communication system. Specifically, example embodiments of the present disclosure provide a technique for efficiently supporting the EAP based on the newest access scheme for emergency communication such as public safety (PS)-long term evolution (LTE).

Recently, a non-standalone (NSA) technique which provides a 5th generation (5G) service via an LTE network with 5G communication commercialization is introduced. NSA may refer, for example, to a technique which utilizes the LTE network and the 5G network like a single network by use of a network virtualization principle. As such an NSA technique is adopted, it may replace a 5G/LTE hybrid station which requires considerable cost and has difficulty in deployment. In addition, since it is practically hard to deploy the expensive 5G/LTE hybrid station throughout the network, an emergency communication technique such as PS-LTE may be used. The PS-LTE may refer, for example, to a technology used for communications required for performing disaster prevention, preparedness, response and recovery in relation to public safety based on the LTE communication technology. PS-LTE may further include a necessary function for performing disaster tasks, based on the LTE technology. Hence, instead of a solution for deploying the hybrid base station requiring high cost throughout the network, fusion of the newest access scheme for emergency communication based on the 5G NSA option and an international mobile subscriber identity (IMSI)/individual tetra subscriber identity (ITSI) compliant terminal may be used.

Based on the above advantages, example embodiments can provide a method and an apparatus for efficiently supporting 5G/LTE EAP allowing an IMSI/ITSL compatible terminal to access the 5G/LTE network via a virtual radio interface. Specifically, to address a load occurring for transition to the 5G network, communicating by employing a dedicated 5G device (e.g., the EAP) may be more efficient in terms of the whole system than upgrading a radio access network (RAN) or a base station. Further, the emergency communication technology itself may be efficient in addressing the communication switching problem as above, but may be still restricted in terms of commercial usage such as a problem of no commercialization in every country or region. Hence, the introduction of the communication technology using the 5G/LTE EAP may be efficient in terms of commercialization and cost.

According to various example embodiments of the present disclosure, a new communication scheme for interconnecting a dedicated device for the EAP function and a terminal is described, and a mobility management and handover orchestration solution based on migration of the terminal is disclosed. More specifically, a technique for expanding a control plane (CP) and a virtual terminal to connect the 5G EAP based on access and mobility management function (AMF) extension and signaling is disclosed.

FIG. 1 illustrates an example communication network including core network entities in a wireless communication system according to various embodiments of the present disclosure. A 5G mobile communication system may include a 5G UE 110, a 5G RAN 120, and a 5G core network.

The 5G core network may include network functions such as an AMF 150 which provides a mobility management function of the UE, a session management function (SMF) 160 which provides a session management function, a user plane function (UPF) 170 which delivers data, a policy and charging function (PCF) 180 which provides a policy and charging function, a unified data management (UDM) 153 which provides a data management function such as subscriber data or policy control data or a unified data repository (UDR) which stores data of various network functions.

Referring to FIG. 1, the UE 110 may perform communication over a radio channel formed with a base station (e.g., an evolved node B (eNB), a next generation node B (gNB)), that is, an access network. In various embodiments, the UE 110 is a device used by a user, and may be configured to provide a user interface (UI). For example, the UE 110 may be a terminal equipped in a vehicle for driving. In various embodiments, the UE 110 may be a device performing machine type communication (MTC) operated without user's involvement, or an autonomous vehicle. In addition to an electronic device, the UE may be referred to as 'a terminal', 'a vehicle terminal', 'a UE', 'a mobile station', 'a subscriber station', 'a remote terminal', 'a wireless terminal', or a 'user device' or another term having an equivalent technical meaning. As the terminal, a customer-premises equipment (CPE) or a dongle type terminal may be used besides the UE. The CPE is connected to an NG-RAN node like the UE, and may provide the network to other communication equipment (e.g., a laptop).

According to various embodiments of the present disclosure, the UE 110 may, for example, refer to terminals included in a communication group which performs cooperative communication. Also, the communication group may be a group formed between terminals serviced in different networks, and the terminals participating in the communication group may transmit data in cooperation. According to various embodiments of the present disclosure, cooperative communication may refer, for example, to a method in which a plurality of terminals of a communication group transmits data by modulating the same data using different modulation schemes. That is, cooperative communication may refer to the plurality of the terminals of the communication group performing cooperative physical layer (PHY) coding in an overlapping network. According to an embodiment, to perform cooperative communication, each terminal belonging to the communication group may perform the modulation in a row of a space-time block coding (STBC) matrix allocated to each terminal.

Referring to FIG. 1, the AMF 150 provides the function for the access and mobility management based on the UE 110, and may be basically connected to one AMF 150 per UE 110. Specifically, the AMF 150 may perform at least one function of signaling between core network nodes for mobility of 3GPP access networks, an interface (N2 interface) between radio access networks (e.g., 5G RAN) 120, non-access stratum (NAS) signaling with the UE 110, identifying the SMF 160, and delivering a session management (SM) message between the UE 110 and the SMF 160. Some or all of the functions of the AMF 150 may be supported within a single instance of one AMF 150.

In the 3GPP system, conceptual links interconnecting network functions (NFs) in the 5G system may be referred to, for example, as reference points. The reference point may be referred to, for example, as an interface. The following illustrates reference points included in the 5G system architecture represented in FIG. 1 through FIG. 7.

N1: a reference point between the UE 110 and the AMF 150

N2: a reference point between the (R)AN 120 and the AMF 150

N3: a reference point between the (R)AN 120 and the UPF 170

N4: a reference point between the SMF 160 and the UPF 170

N5: a reference point between the PCF 180 and the AF 130

N6: a reference point between the UPF 170 and the DN 140

N7: a reference point between the SMF 160 and the PCF 180

N8: a reference point between the UDM 153 and the AMF 150

N9: a reference point between two core UPFs 170

N10: a reference point between the UDM 153 and the SMF 160

N11: a reference point between the AMF 150 and the SMF 160

N12: a reference point between the AMF 150 and an authentication server function (AUSF) 151

N13: a reference point between the UDM 153 and the AUSF 151

N14: a reference point between two AMFs 150

N15: a reference point between the PCF 180 and the AMF 150 in a non-roaming scenario, and a reference point between the PCF 180 and the AMF 150 in a visited network in a roaming scenario N22: a reference point between the NSSF 190 and the AMF 150

Figure 2A:
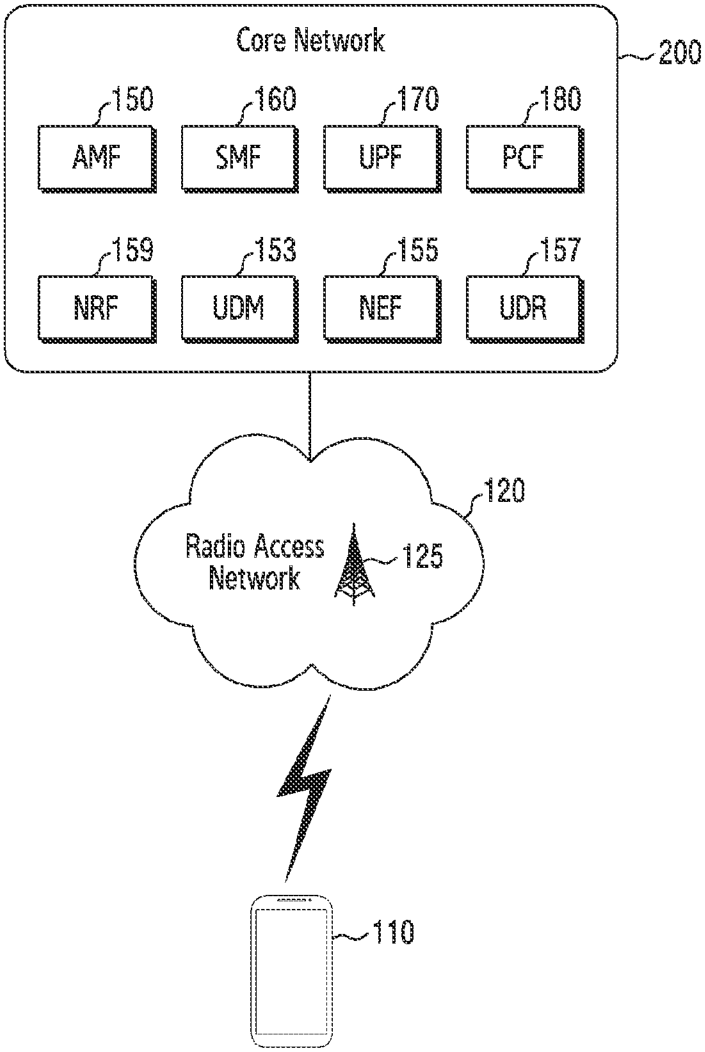
FIG. 2A illustrates an example wireless environment including a core network in a wireless communication system according to various embodiments.

FIG. 2A illustrates an example wireless environment including a core network 200 in a wireless communication system according to various embodiments of the present disclosure.

Referring to FIG. 2A, the wireless communication system includes a RAN 120 and a core network (CN) 200.

The RAN 120 is a network directly connected to a user device, for example, a terminal 110, and is an infrastructure which provides radio access to the terminal 110. The RAN 120 may include a set of base stations including a base station 125, and the plurality of the base stations may perform communication via interfaces established between them. At least some of the interfaces between the plurality of the base stations may be wired or wireless. The base station 125 may have a structure divided into a central unit (CU) and a distributed unit (DU). In this case, a single CU may control a plurality of DUs. The base station 125 may be referred to as, in addition to a base station, an 'AP', a 'gNB', a '5G node', a 'wireless point', a 'transmission/reception point (TRP)', or any other term having an equivalent technical meaning. The terminal 110 accesses the RAN 120, and communicates with the base station 125 over a radio channel. The terminal 110 may be referred to as, in addition to a terminal, a 'UE', a 'mobile station', a 'subscriber station', a 'remote terminal', a 'wireless terminal', a 'user device' or any other term having an equivalent technical meaning.

The CN 200, which is a network for managing the whole system, controls the RAN 120 and processes data and control signals for the terminal 110 transmitted or received over the RAN 120. The CN 200 performs various functions such as controlling the user plane and the control plane, processing mobility, managing subscriber information, charging, and interworking with systems of other types (e.g., the LTE system). To fulfill the described various functions, the CN 200 may include a plurality of entities functionally separated with different NFs. For example, the CN 200 may include an AMF 150, an SMF 160, a UPF 170, a PCF 180, a network repository function (NRF) 159, a UDM 153, a network exposure function (NEF) 155, and a UDR 157.

The terminal 110 is connected to the RAN 120 to access the AMF 150 which performs the AMF of the CN 200. The AMF 150 is a function or a device which manages both the access of the RAN 120 and the mobility management of the terminal 110. The SMF 160 is an NF which manages the session. The AMF 150 is connected to the SMF 160, and the AMF 150 routes a session related message of the terminal 110 to the SMF 160. The SMF 160 is connected to the UPF 170 to allocate a user plane resource to be provided to the terminal 110, and to establish a tunnel for transmitting data between the base station 125 and the UPF 170.

The PCF 180 controls policy and charging related information of a session used by the terminal 110. The NRF 159 performs a function of storing information of NFs installed in the mobile communication provider network, and notifying the stored information. The NRF 159 may be connected to all of the NFs. The NFs each, if initiating its driving in the provider network, registers at the NRF 159 and thus notifies the NRF 159 that the corresponding NF is operating in the network. The UDM 153 is an NF performing a similar role to a home subscriber server (HSS) of the 4G network, and stores subscription information of the terminal 110, or context used by the terminal 110 in the network.

The NEF 155 performs a role of interconnecting a third party server and the NF in the 5G mobile communication system. Also, NEF 155 performs a role of providing data to the UDR 157, or acquiring data. The UDR 157 may perform a function of storing subscription information of the terminal 120, storing policy information, storing data exposed to outside, or storing necessary information of a third party application. In addition, the UDR 157 performs a role of providing the stored data to other NFs.

According to various embodiments of the present disclosure, the RAN 120 may include the base station 125. The base station 125 may be a network infrastructure for providing radio access to the terminals 120. The base station 125 may have coverage defined as a specific geographic region based on a signal transmission distance. In addition to base station, the base station 125 may be referred to as an 'AP', an 'eNB', a '5G node', a 'gNB', a 'wireless point', and a 'TRP' or any other term having an equivalent technical meaning. The base station 125 according to an embodiment of the present disclosure may, for example, refer to the gNB of the 5G. However, some eNB functions of 4G may be maintained due to a proximity service (ProSe) function in the base station 125.

According to various embodiments of the present disclosure, the base station 125 and the terminal 110 may transmit and receive radio signals in a millimeter wave (mmWave) band (e.g., 28 GHz, 30 GHz, 38 GHz, 60 GHz). In so doing, to improve a channel gain, the base station 125 and the terminal 110 may perform beamforming. In the present disclosure, space-time coding may refer, for example, to a multi-antenna transmission method which maps modulation symbols to time and space domains (transmit antennas) to acquire diversity by the multiple transmit antennas. According to an embodiment of the present disclosure, the method and the apparatus of the present invention may operate in emergency systems operating in an emergency situation. According to an embodiment, the emergency system may include the PS-LTE system. In the emergency system according to an embodiment of the present disclosure, relevant entities may be connected to a group immediately with the help of an IP multimedia subsystem (IMS). For example, the immediate group connection may be similar to terrestrial trunked radio (TETRA).

Figure 2B:
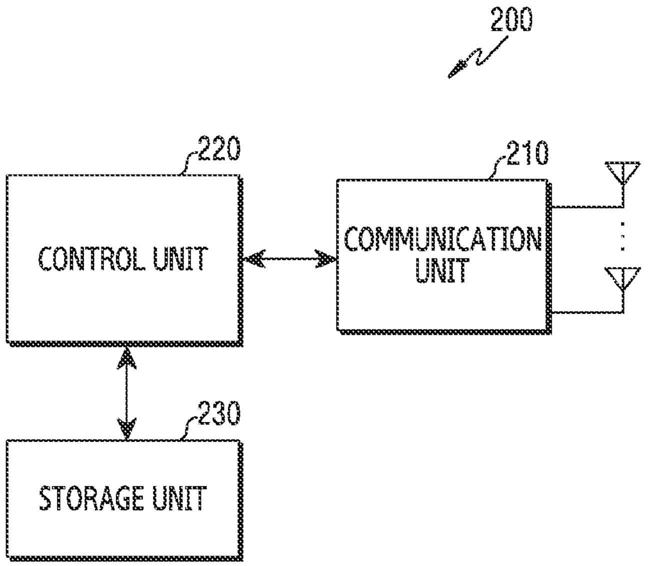
FIG. 2B illustrates a configuration of an example core network entity in a wireless communication system according to various embodiments.

FIG. 2B illustrates an example configuration of a core network entity in a wireless communication system according to various embodiments of the present disclosure. A configuration 200 illustrated in FIG. 2B may be understood as the configuration of the device having at least one functionality of 150, 153, 155, 157, 160, 170, 180 and 190 of FIG. 1. Hereafter, a term such as '~unit' or '~er' used hereafter may, for example, refer to a unit for processing at least one function or operation, and may be implemented using hardware, software, or a combination of hardware and software.

Referring to FIG. 2B, the core network entity includes a communication unit 210 (including, e.g., communication circuitry), a storage unit 230 (including, e.g., a storage), and a control unit 220 (including, e.g., control circuitry).

The communication unit 210 provides an interface to communicate with other devices in the network. That is, the communication unit 210 converts a bit stream transmitted from the core network object to another device into a physical signal, and converts a physical signal received from another device into a bit stream. That is, the communication unit 210 may transmit or receive a signal. Accordingly, the communication unit 210 may be referred to, for example, as a modem, a transmitter, a receiver, or a transceiver. In this case, the communication unit 210 enables the core network entity to communicate with other devices or systems via a backhaul connection (e.g., a wired backhaul or a radio backhaul) or the network.

The storage unit 230 stores data such as a basic program, an application program, and setting information for the operation of the core network entity. The storage unit 230 may be configured with a volatile memory, a non-volatile memory, or a combination of a volatile memory and a non-volatile memory. The storage unit 230 provides the stored data at a request of the control unit 220.

The control unit 220 controls general operations of the core network entity. For example, the control unit 220 transmits and receives a signal via the communication unit 210. Also, the control unit 220 records and reads data in and from the storage unit 230. For doing so, the control unit 220 may include at least one processor. According to various embodiments of the present disclosure, the control unit 220 may control to perform synchronization using the wireless communication network. For example, the control unit 220 may control the core network entity to carry out operations according to various embodiments to be described.

Figure 2C:
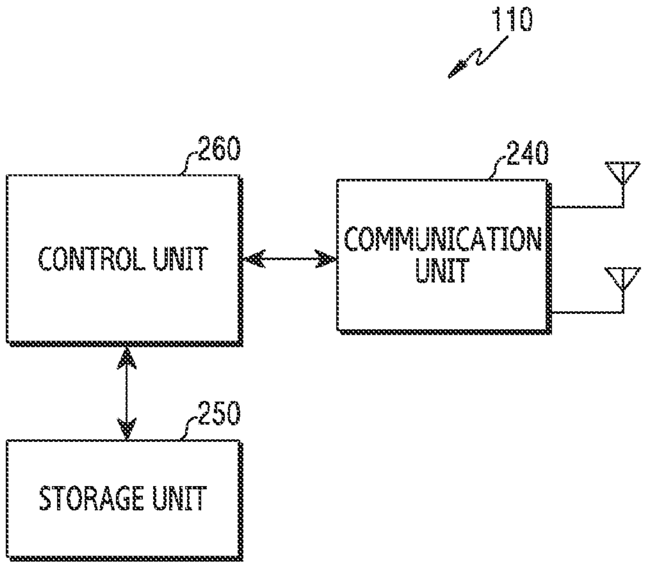
FIG. 2C illustrates a configuration of an example extended access point (EAP) in a wireless communication system according to various embodiments.

FIG. 2C illustrates an example configuration of a terminal in a wireless communication system according to various embodiments of the present disclosure. The configuration illustrated in FIG. 2C may be understood as a configuration of, for example, the terminal 120. According to an embodiment, the configuration illustrated in FIG. 2C may be understood as a configuration of an EAP residing and communicating between the base station 125 and the terminal 110. A term '~unit' or '~er' used hereinafter may, for example, refer to a unit for processing at least one function or operation, and may be implemented in hardware, software, or a combination of hardware and software.

Referring to FIG. 2C, the terminal (or the EAP) may include a communication unit 240 (including, e.g., communication circuitry), a storage unit 250 (including, e.g., a storage), and a control unit 260 (including, e.g., control circuitry).

The communication unit 240 performs functions for transmitting or receiving a signal over the radio channel. For example, the communication unit 240 performs a conversion function between a baseband signal and a bit stream according to the physical layer standard of the system. For example, in data transmission, the communication unit 240 generates complex symbols by encoding and modulating a transmit bit stream. Also, in data reception, the communication unit 240 restores a receive bit stream by demodulating and decoding a baseband signal. Also, the communication unit 240 up-converts a baseband signal into a radio frequency (RF) band signal and transmits the same via an antenna, and down-converts an RF band signal received through an antenna into a baseband signal. For example, the communication unit 240 may include a transmit filter, a receive filter, an amplifier, a mixer, an oscillator, a digital to analog converter (DAC), an analog to digital converter (ADC), and the like.

Also, the communication unit 240 may include a plurality of transmit and receive paths. Further, the communication unit 240 may include at least one antenna array including a plurality of antenna elements. In terms of hardware, the communication unit 240 may include a digital circuit and an analog circuit (e.g., a radio frequency integrated circuit (RFIC)). Herein, the digital circuit and the analog circuit may be implemented in a single package. The communication unit 240 may include a plurality of RF chains. Further, the communication unit 240 may perform beamforming.

The communication unit 240 transmits and receives the signal as described above. Accordingly, all or a part of the communication unit 240 may be referred to as 'a transmitter', 'a receiver', or 'a transceiver'. Also, transmission and reception conducted over the radio channel is used to include the above-described processing performed by the communication unit 240 in the following description.

The storage unit 250 stores data such as a basic program, an application program, and setting information for the operation of the terminal. The storage unit 250 may be configured with a volatile memory, a non-volatile memory, or a combination of a volatile memory and a non-volatile memory. The storage unit 250 provides the stored data at a request of the control unit 260.

The control unit 260 controls general operations of the terminal. For example, the control unit 260 transmits and receives a signal through the communication unit 240. In addition, the control unit 260 records and reads data in and from the storage unit 250. The control unit 260 may perform functions of a protocol stack required by the communication standard. For doing so, the control unit 260 may include at least one processor or a micro-processor, or may be a part of a processor. A part of the communication unit 240 and the control unit 260 may be referred to as a communication processor (CP). According to various embodiments, the control unit 260 may control to perform synchronization using the wireless communication network. For example, the control unit 260 may control the terminal to perform operations according to various embodiments to be described.

Although not depicted in FIG. 2C, the EAP may further include a communication unit which serves as a backhaul communication unit of the base station 125. The EAP may transmit and receive signals by establishing an X2 interface with another EAP or the base station (the gNB or the eNB) via the communication unit serving as the backhaul communication unit.

Terms for identifying access nodes, terms for indicating network entities, terms for indicating messages, terms for indicating interfaces between network entities, and terms for indicating various identification information used in the following explanation are provided for convenience of explanation. Accordingly, the present disclosure is not limited to the following terms, and other terms having the same technical meaning may be used.

The specific description of embodiments of the present disclosure is mainly based on NR which is the radio access network and a packet core (a 5G system, a 5G core network, or a next generation (NG) core) which is a core network on the 5G mobile communication standard specified by 3GPP which is the mobile communication standardization organization, but the technology of the present disclosure may be applied to other communication systems having a similar technical background with slight modifications without departing from the scope of the present disclosure.

A unit node performing the functions provided by the 5G network system may be defined as an NF (e.g., an NF entity or an NF node). Each NF may include at least one of the AMF which manages access of the UE to an access network (AN) and mobility, the SMF which performs session related management, the UPF which manages the user data plane, or a network slice selection function (NSSF) which selects an available network slice instance for the UE.

Figure 3:
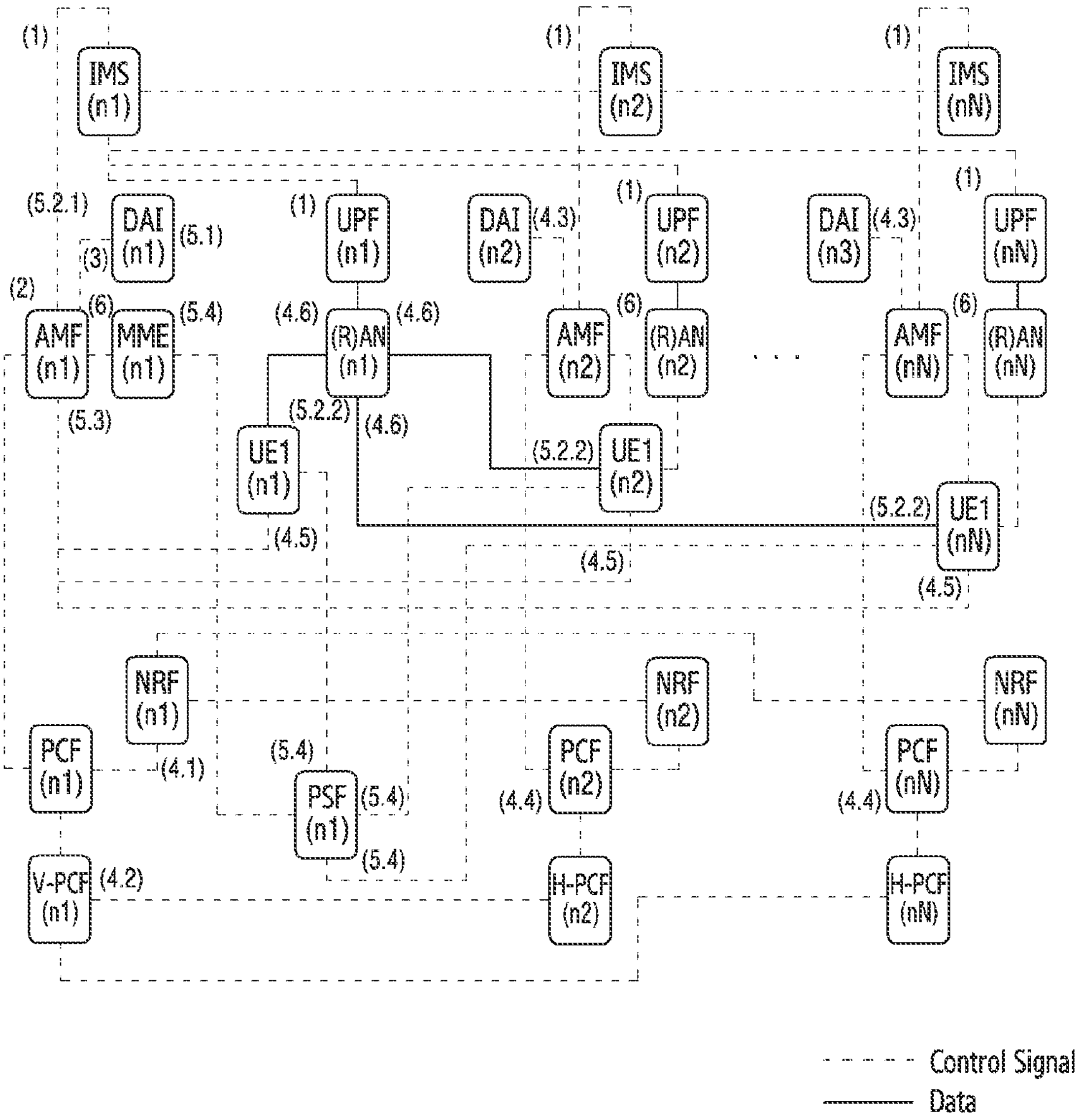
FIG. 3 illustrates an example network architecture with a communication group formed to perform cooperative transmission in a wireless communication system according to various embodiments.

FIG. 3 illustrates an example network architecture with a communication group formed to perform cooperative transmission in a wireless communication system according to various embodiments of the present disclosure. Specifically, according to various embodiments of the present disclosure, an example of operations performed if cooperative transmission is required, during communications between a core network, a base station and a terminal, is illustrated.

Referring to FIG. 3, an AMF, an NRF, a RAN, a PCF, a UPF and so on may, for example, refer to entities included in a network core. In addition, the core may further include a mobility management entity (MME) and a proximity services function (PSF). According to an embodiment, a first UE, a second UE and a third UE may, for example, refer to UEs connected to different networks such as a first network, a second network, and a third network.

In step 1, the first UE, the second UE and the third UE belonging to different networks may perform a conference call over IMSs. The first network, the second network, and the third network may, for example, be overlapping networks. Three overlapped networks are illustrated to ease the explanation, but the disclosure is not limited in this respect. The first IMS may notify a call from the first UE to a first AMF. In addition, the first IMS may notify calls of a first UPF, a second UPF and a third UPF. The conference call over the IMS may be performed in a known manner. The conference call according to an embodiment may be switched to cooperative transmission.

In step 2, the first AMF (originating AMF) may perform asynchronous or synchronous initiation of communication groups which perform cooperative transmission. The asynchronous or synchronous initiation may indicate that the different networks may create communication groups for performing the cooperative transmission on their own or using communication between distributed artificial intelligence (DAI) modules. The core according to an embodiment may include a plurality of AMFs, but it may be assumed that each network includes one AMF for convenience of description.

In step 3, the first AMF may call a first DAI entity. In the present disclosure, the DAI may, for example, refer to a module used to perform cooperative transmission and cooperative coding. The DAI according to an embodiment may be instantiated, and the DAI may be invoked to operate only if the network performs the operations specified in the present disclosure. The DAI according to an embodiment of the present disclosure may be implemented as an independent entity. Also, according to an embodiment, the DAI may be some configuration of the AMF. A function performed by the DAI entity according to an embodiment of the present disclosure may be invoked by each AMF orchestrating functionality proposed in the present disclosure. Due to the decentralized feature of the DAI, multiple cooperative transmissions coordinated by the overlapping networks respectively may be coordinated, and communications between different DAIs may be conducted.

In step 4.1, the first AMF may acquire PCF IDs (e.g., PCF identification information) of the second UE and the third UE being remote terminals through NRF to NRF communication.

In step 4.2, the first AMF may instantiate a visited (V)-PCF and one or more home (H)-PCFs. According to the 3GPP access scheme, the PCF of the visited network of the UE may, for example, refer to the V-PCF in view of the UE, and the PCF of the network (e.g., a home network) originally accessed by the UE may, for example, refer to the H-PCF. For example, if the first network is the originating network, the first PCF belonging to the first network may, for example, refer to the V-PCF, and the second PCF and the third PCF may, for example, refer to the H-PCFs. Alternatively, the first PCF may include the V-PCF, and the second and third PCFs may include the H-PCF. Alternatively, it may, for example, refer to instantiating the first PCF belonging to the first network to the V-PCF, or instantiating the second PCF and the third PCF included in other networks than the originating network to the H-PCFs. The H-PCFs may, for example, refer to all PCFs which service the remote UEs (e.g., the second UE and the third UE), and the PCFs may become H-PCFs if attempting roaming to another network.

In step 4.3, the first AMF may instantiate connections with the second DAI entity and the third DAI entity, which are the DAIs attached to the second AMF and the third AMF which are the AMFs serving the second UE and the third UE which are the remote UEs. As described above, the function performed by the DAI entity may be invoked by the orchestrating functionality of each AMF described in the present disclosure.

In step 4.4, the first AMF 640-1 may identify willingness for participating in the communication group from the second UE and the third UE which are the remote UEs. The willingness for participating in the communication group of the UEs each may be changed. According to an embodiment, the first AMF, which acquires the VDF IDs of the first UE and the second UE which are the remote UEs, may use a control channel related to the PCF ID. The H-PCF may transmit request information for identifying the communication group participation willingness of the first AMF to the UE. In addition, the H-PCF may obtain confirmation on information and requests related to the participation or the participation willingness from the second UE and the third UE, and retransmit the obtained information to the first AMF.

In step 4.5, the first AMF may form logical cooperative communication groups by connecting the second UE and the third UE which are the remote UES to the first AMF.

In step 4.6, the first AMF according to an embodiment of the present disclosure may instantiate physical cooperative communication groups by connecting the second UE and the third UE, which are the remote UEs, to the first RAN.

The logical cooperative communication group may, for example, refer to a communication group being formed in the core network step and control communication being enabled. In addition, the physical cooperation communication group may, for example, refer to that a communication group being formed for the RAN step and data communication being enabled. Also, at this step, the physical connection step formed for the RANs may occur simultaneously in several networks, and may be orchestrated by the DAI entities. Through the above-described steps, the first AMF may establish the communication group.

In step 5.1, the first DAI entity may select a code matrix. The code matrix may include a space-time block code matrix (e.g., a code matrix Cx). According to an embodiment, selecting the space-time block code matrix may be performed in an initial round if forming the communication group, and does not need to be performed every time. According to an embodiment, each code matrix may include several columns to be allocated to indicate the modulation scheme for each UE. According to an embodiment, the first DAI entity may allocate each column of the code matrix to each UE based on radio channel parameters between the UEs forming the communication group and a UE serviced by this communication group.

In step 5.2.1, the first DAI entity may provide information of the best-suited UE for each code matrix column. According to an embodiment, the information request of the best-suited UE may be performed in the initial round if forming the communication group, and may not be performed every time. As the AI learning of the DAI continues, the performance of finding an appropriate UE may be improved.

In step 5.3, information allocated for the column of each code matrix may be transmitted to each UE through the physical connection established for the first RAN. The allocated information may indicate information of how each UE performs signal modulation to satisfy requirements of the space-time code selected or given. According to an embodiment, based on an instruction of the first DAI entity, the code matrix (Cx) size may be expanded or reduced. By expanding or reducing the code matrix size, dynamic switching between different codes may be allowed. That is, the dynamic switching between G2, G3, and G4 which are matrices with different number of columns may be allowed, or may be switched to non-orthogonal designs or quasi-orthogonal designs which tend to have greater matrices.

In step 5.4, the cooperative transmission may be integrated with a device to device (D2D) function through the MME and a prose function (PSF), for appropriate uplink and downlink transmissions. Hence, it may be linked with the PS-LTE technology. The UEs included in the communication group which performs the cooperative transmission may be a kind of gNB expansion. If the UEs included in the communication group service a specific remote UE to which the gNB may not generally transmit data, it is necessary to identify whether all the UEs included in the communication group transmit data in the downlink rather than the uplink. Similarly, if a signal is transmitted from the remote UE to the gNB through the communication group, data transmission should be performed in the uplink rather than the downlink.

In step 6, the first AMF may automatically update the above-described operations according to the instruction of the first DAI entity. In addition, all the AMFs included in each network may also automatically update the above-described operations.

As described above, referring to FIG. 3, the functional operations of the core network for the communication with the remote UE are disclosed through the network architecture with a communication group established for performing the cooperative transmission. Hereafter, it is noted that systematic operations with the core network mentioned above may be applied to embodiments for supporting the EAP according to various embodiments of the present disclosure.

Figure 4:
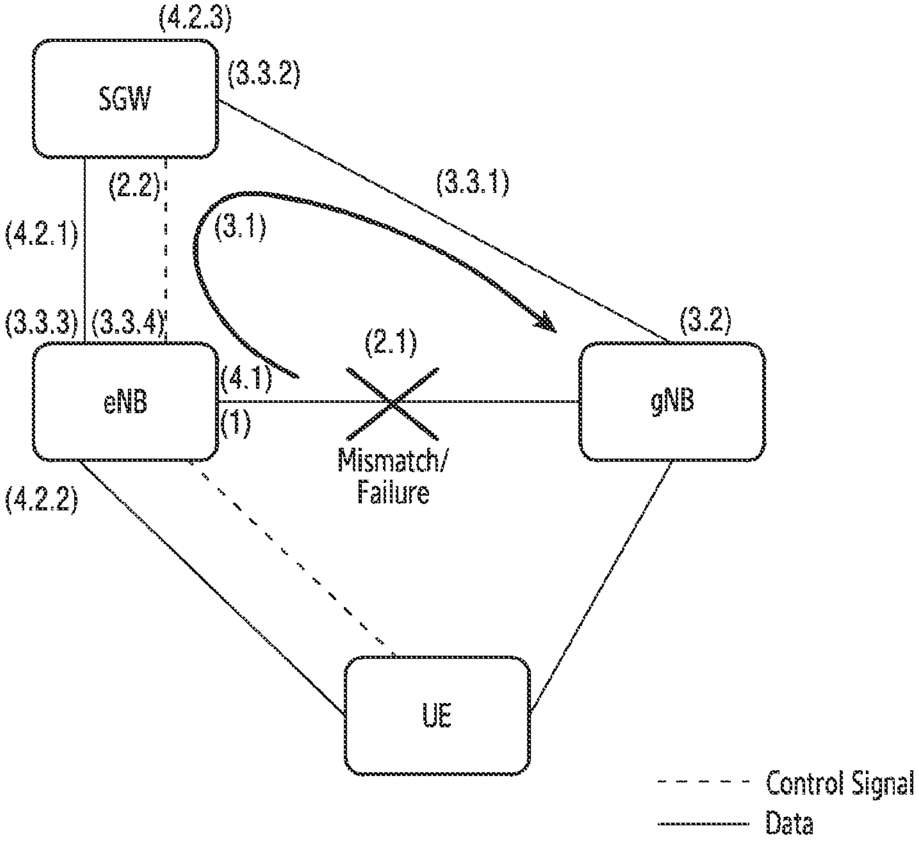
FIG. 4 illustrates an example network architecture including a core network related to a connection between an eNodeB (eNB) and a next generation node B (gNB) in a wireless communication system according to various embodiments.

FIG. 4 illustrates an example network architecture including a core network related to a connection between an eNB and a gNB in a wireless communication system according to various embodiments of the present disclosure. Specifically, according to various embodiments of the present disclosure, an example of operations performed for a base station connection of the core network, while performing communications between the core network, the base station and a UE is illustrated.

Referring to FIG. 4, the UE may be connected to each of the eNB which is the LTE base station and the gNB which is the 5G base station. The eNB and the gNB may be connected to a serving gateway (SGW) which is the core network entity of the LTE. According to an embodiment, the SGW may serve as an anchor in call configuration management, packet data delivery, IP mobility management or handover. Referring to FIG. 4, inactivating the connection of the eNB and the gNB, using both the LTE network and the 5G NR network, as a sort of the NSA scheme, if there is a connection structure via an evolved packet core (EPC) which is the LTE core network, is illustrated.

In step 1, the eNB may be connected to the gNB under an option 3x mode. The 5G NSA option 3x mode may include a procedure of splitting to LTE and 5G in a 5G cell, the eNB and the gNB may be connected via the X2 interface, the EPC (e.g., the SGW) and the eNB may be connected via an S1 interface, and the EPC (e.g., the SGW) and the gNB may be connected via an S1-U interface.

In step 2.1, if the eNB does not identify the gNB due to connection failure or mismatch, the eNB may temporarily deactivate the X2 interface connected to the gNB.

In step 2.2, the eNB may notify the SGW of the connection failure or mismatch.

In step 3.1, the SGW may identify the connection failure or mismatch between the eNB and the gNB. According to an embodiment, the SGW may change the connection state to an option 3a mode, and initiate or instantiate rollback of the changed option 3a mode. The 5G NSA option 3a mode may include a procedure of splitting traffic into LTE and 5G at the SGW, data rate bearer (DRB) is not split unlike the option 3x mode, and the traffic may be delivered to the UE using only one of the LTE or the NR.

In step 3.2, the SGW may notify the gNB of the configuration change and inclusion of the configuration change in the split-bearer task.

In step 3.3.1, the SGW may instantiate load sharing at the SGW. According to an embodiment, the SGW may establish an S1 bearer with the gNB and monitor a load/coverage situation of the gNB.

In step 3.3.2, if the load/coverage situation of the gNB occurs due to the connection failure or mismatch of the X2 interface, the SGW may buffer (e.g., temporarily store) a related portion of the traffic to transmit until the above problem is address for recovery.

In step 3.3.3, the SGW may establish an S1 bearer with the eNB, and transmit part of the buffered traffic via the eNB.

In step 3.3.4, the SGW may monitor the load/coverage situation of the eNB, and reestablish the transmission path of the traffic, if bottleneck of the traffic occurs.

In step 4.1, the eNB may reattempt the reestablishment of the X2 interface with the gNB. If the X2 interface between the eNB and the gNB is reestablished, the 5G NSA option 3x mode may be applied.

In step 4.2.1, if the reestablishment of the X2 interface fails, distributed load sharing of the modified option 3a mode may be executed. According to an embodiment, bidirectional flow control information may be established between the eNB and the SGW.

In step 4.2.2, if there is a time constraint on the traffic transmission, the traffic may be modified or changed immediately at the eNB in the transmission.

In step 4.2.3, if there is no time constraint on the traffic transmission, the traffic may be modified or changed at the SGW.

As mentioned above, referring to FIG. 4, the functional operations for controlling or transmitting and receiving the traffic if the connection between the eNB and the gNB fails in the 5G NSA are disclosed. Hereafter, it is noted that systematic operations with the aforementioned core network and the base station may be applied to embodiments for supporting the EAP according to various embodiments of the present disclosure.

Figure 5A:
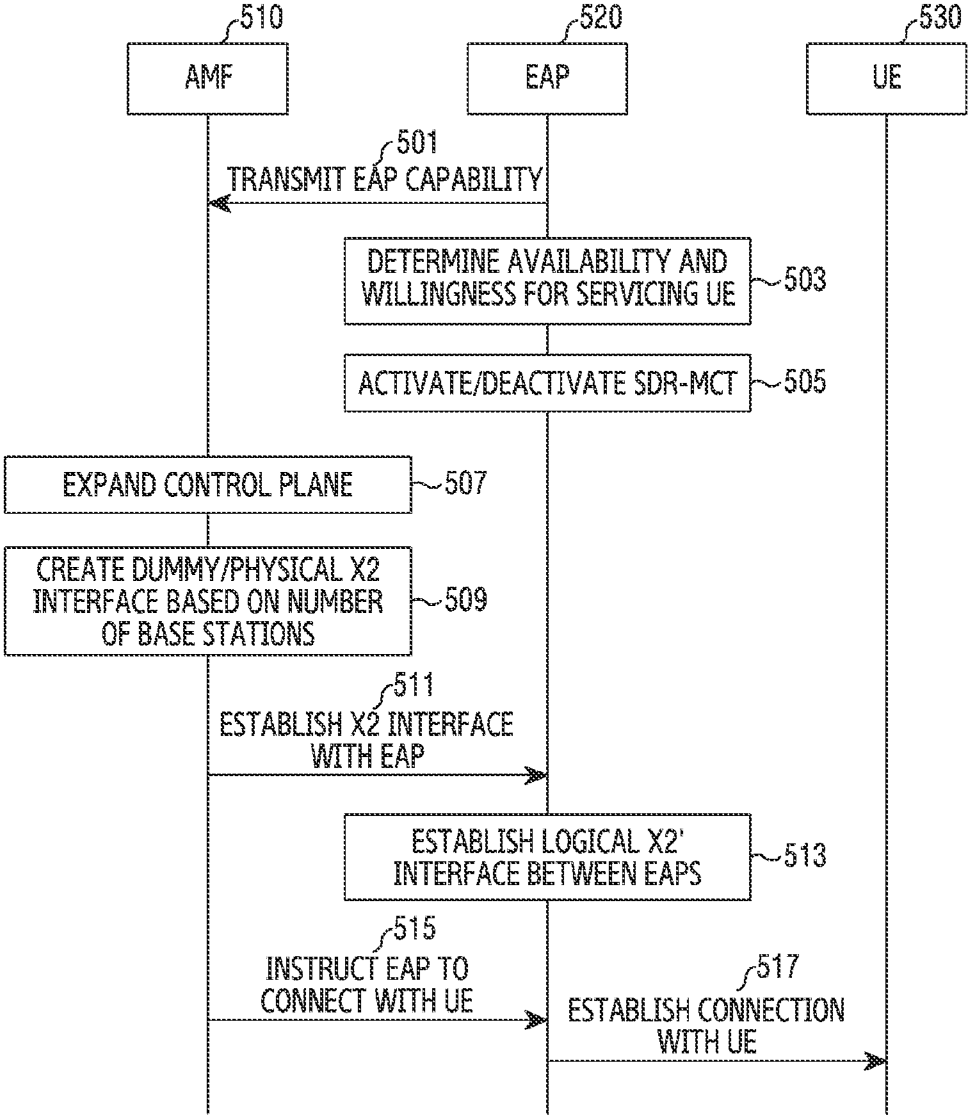
FIG. 5A illustrates example signal flows for establishing a connection of an EAP and a user equipment (UE) according to various embodiments.

FIG. 5A illustrates example signal flows for establishing a connection of an EAP and a UE according to various embodiments of the present disclosure. Referring to FIG. 5A, an AMF 510 and an EAP 520 may transmit and receive signals via the eNB/gNB (hereafter, described as the base station). According to an embodiment, the EAP may reside between the base station and the UE, and may differ from a simple relay device (e.g., a repeater device) in that it may perform active control. Herein, the EAP 520 may be included in coverage of the base station, and a UE 530 may be located outside the base station coverage. According to various embodiments of the present disclosure, the order of the steps shown in FIG. 5A is merely an example, and may be performed regardless of the order of the steps. According to various embodiments, all or some of the steps or at least one of some combinations may be performed.

In step 501, the EAP 520 may transmit EAP capability related information to the AMF 510. More specifically, according to an embodiment, the EAP 520 may trigger the AMF 510 to identify the EAP capability related information through advertising. Advertising is, for example, a method for transmitting a signal without designating a specific entity, and may, for example, refer to a scheme of periodically transmitting a signal regardless of the connection. According to an embodiment, the AMF 510 may identify the EAP capability related information through polling. Polling may, for example, refer to a scheme in which one device periodically examines the state of other device for the sake of synchronization processing, and transmits and receives with the other device, if a specific condition is satisfied. According to an embodiment, the AMF 510 receiving the EAP capability related information may determine availability of the signal transmission via the EAP 520. According to an embodiment, the AMF 510 receiving the EAP capability related information may determine the availability of the signal transmission via the EAP 520, based on the EAP capability related information received from the EAP 520.

In step 503, the EAP 520 may determine willingness for servicing an IMSI/ITSI compliant UE 530 (hereafter, described as a terminal). The IMSI may, for example, refer to a unique ID for identifying a mobile communication subscriber throughout the world. A format of the IMSI may include a public land mobile network (PLMN) ID and a mobile subscriber identifier number (MSIN), the PLMN ID may, for example, refer to an ID for identifying the communication provider throughout the world, and the MSIN may, for example, refer to a unique ID for identifying a subscriber in a corresponding communication provider. The ITSI may, for example, refer to a unique ID for identifying a tetra system subscriber. A format of the ITSI may include a (tetra) mobile country code ((T)MCC), a (tetra) mobile network code ((T)MNC) and an individual short subscriber identity (ISSI). According to an embodiment, the EAP 520 may identify the terminal 530 in the coverage of the EAP 520, and determine whether to service the identified terminal 530.

In step 505, the EAP 520 may determine whether to activate software defined radio (SDR)-modulation & coding translation (MCT). According to an embodiment, the EAP 520 may determine whether to activate the SDR-MCT based on at least one of whether the EAP capability related information is transmitted or whether the willingness for servicing the terminal 530 is determined. SDR may, for example, refer to a technology for processing modulation or demodulation in software in the wireless communication. According to an embodiment, the EAP 520 may translate modulation and coding of a signal to transmit to the terminal 530 or a signal received from the terminal 530 using the SDR technology based on a tunable filter and a software codec.

In step 507, the AMF 510 may expand the CP. According to an embodiment, the AMF 510 may expand the CP to include EAPs residing in the coverage of each base station. According to an embodiment, the AMF 510 may expand the CP to encompass the EAP 520 determining the willingness for servicing the terminal 530. According to an embodiment, the AMF 510 may instruct the base station to expand the CP to include the EAP 520 determining the willingness for servicing the terminal 530.

In step 509, the AMF 510 may bring up a dummy interface or the physical X2 interface. According to an embodiment, the AMF 510 may instruct the base station to establish the dummy or physical X2 interface based on a number of base stations connected. According to an embodiment, the base station may establish the X2 interface with the base station on another cell. According to an embodiment, if not reaching the base station on the other cell, the base station may establish the dummy interface having itself as an end point.

In step 511, the AMF 510 may establish the X2 interface with the EAP 520. According to an embodiment, the AMF 510 may instruct the base station to establish the physical X2 interface with the EAP 520. According to an embodiment, the base station may establish the physical X2 interface with the EAP 520 based on the instruction received from the AMF 510. According to an embodiment, the base station may establish the physical X2 interface with at least one EAP 520 residing in the base station coverage. According to an embodiment, the physical X2 interface may be a path for performing transmission and reception related to control and data.

In step 513, the EAP 520 may establish a logical X2' interface with another EAP. According to an embodiment, the EAP 520 may establish the logical X2' interface with another EAP included its range. According to an embodiment, the logical X2' interface may be a path for performing control related transmission and reception.

In step 515, the AMF 510 may instruct the EAP 520 to establish a connection with the terminal 530. According to an embodiment, based on the instruction of the AMF 510, the terminal 530 activating a wireless fidelity (Wi-Fi) function may be connected with the EAP 520 via a Wi-Fi AP included by the EAP 520. According to an embodiment, based on the instruction of the AMF 510, the terminal 530 deactivating the Wi-Fi function may be connected with the EAP 520 via an entity which performs the SDR-MCT included by the EAP 520. According to an embodiment, based on the instruction of the AMF 510, the terminal 530 activating the Wi-Fi function may include the terminal 530 having the IMSI as the identifier or the terminal 530 deactivating the Wi-Fi function may include the terminal 530 having the ITSI as the identifier. Notably, the disclosure is not limited to the above described embodiments, and the EAP 520 may include at least one of the entity for performing the SDR-MCT or the Wi-Fi AP, and adaptively establish the connection based on characteristics of the terminal 530.

In step 517, the EAP 520 may establish the connection with the terminal 530. According to an embodiment, the terminal 530 may be attached to the EAP 502 based on the instruction received from the AMF 510. According to an embodiment, the terminal 530 activating the Wi-Fi function may be connected to the EAP 502 via the Wi-Fi AP included in the EAP 520. According to an embodiment, the terminal 530 deactivating the Wi-Fi function may be connected to the EAP 502 via the entity which performs the SDR-MCT included in the EAP 520. According to an embodiment, the terminal 530 activating the Wi-Fi function may include the terminal 530 having the IMSI as the identifier or the terminal 530 deactivating the Wi-Fi function may include the terminal 530 having the ITSI as the identifier. Notably, the disclosure is not limited to the above described embodiments, and the EAP 520 may include at least one of the entity performing the SDR-MCT or the Wi-Fi AP, and adaptively establish the connection based on the characteristics of the terminal 530. If the connection establishment of the EAP 520 and the terminal 530 is completed, the terminal 530, which resides out of the base station coverage but is included in the coverage of the EAP 520, may communicate with the EAP 520 which substantially functions the same as the base station.

Although not depicted in FIG. 5A, if the terminal 530 hands over between the EAPs connected via the X2' interface or if the availability and the willingness of the EAP 520 establishing the connection with the terminal 530 for servicing the terminal 530 are changed, the terminal 530 may further perform the following steps to establish a new connection with a target EAP.

The terminal 530 may obtain consent for the handover from the target EAP and the connected AMF 510. According to an embodiment, the terminal 530 may transmit a measurement report to the connected EAP 520. The EAP 520 receiving the measurement report from the terminal 530 may identify the required handover of the terminal 530. According to an embodiment, if the EAP 520 identifies the required handover of the terminal 530, the EAP 520 may notify the AMF 510 of terminal handover related information. Based on this, the AMF 510 may identify the terminal handover required between the EAPs, and transmit its consent. According to an embodiment, the EAP 520 connected with the terminal 530 may transmit the handover related information to the target EAP. According to an embodiment, the EAP 520 connected with the terminal 530 may transmit the handover related information to the target EAP via the logical X2' interface. If obtaining the consent from both the target EAP and the AMF 510, the terminal 530 may successfully establish the new connection with the target EAP.

If the terminal 530 does not obtain the consent from at least one of the target EAP and the AMF 510, the AMF 510 may arrange a new EAP connection for servicing the terminal 530. Arranging the new EAP connection at the AMF 510 may be carried out by various embodiments of the present disclosure described earlier. According to an embodiment, as illustrated in FIG. 3, the connection establishment process between the new EAP, the terminal 530 and the core network (e.g., the AMF 510) may be conducted, to instantiate the cooperative transmission.

Figure 5B:
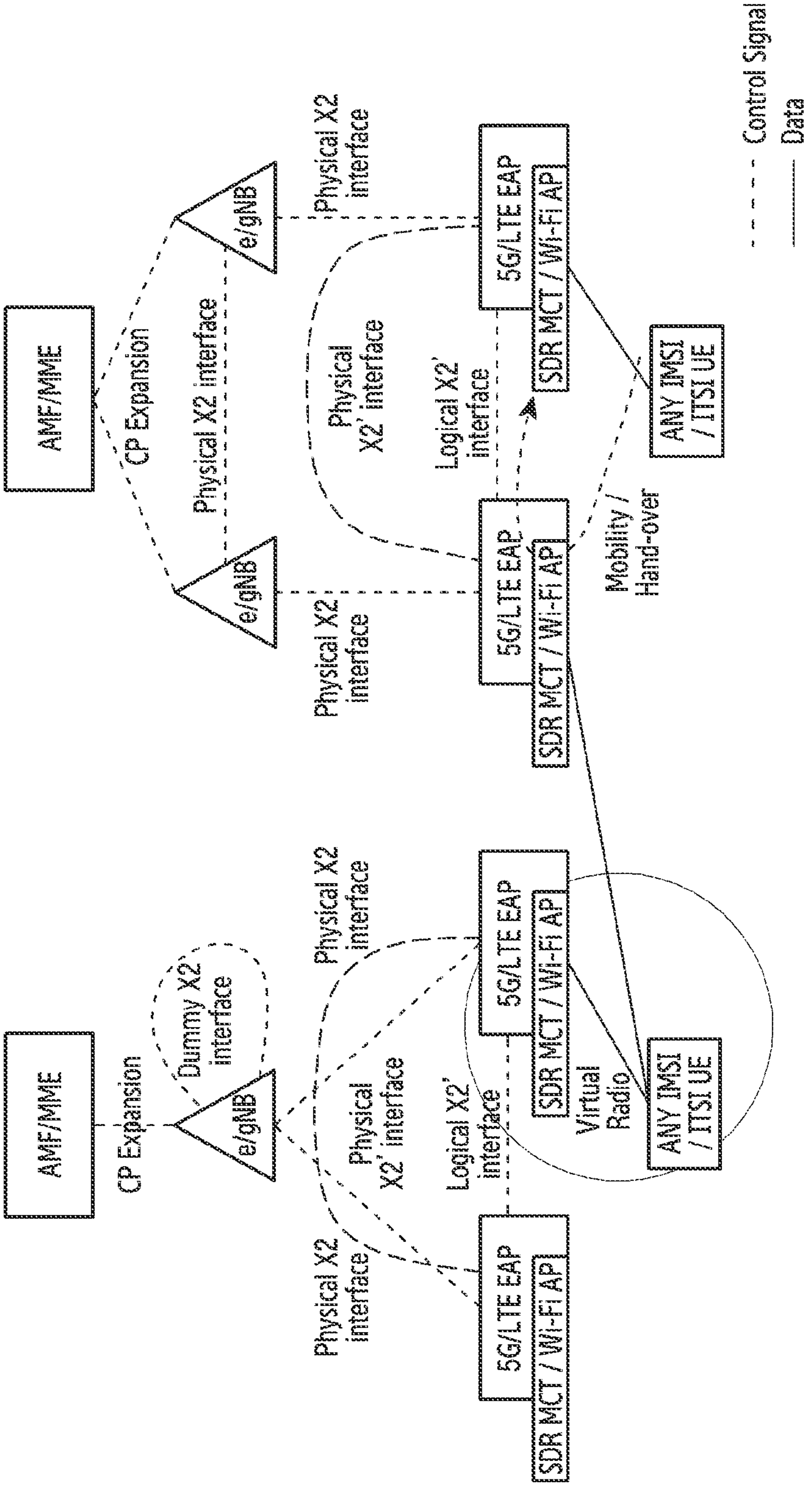
FIG. 5B illustrates an example network architecture for establishing a connection of an EAP and a UE according to various embodiments.

FIG. 5B illustrates an example network architecture for establishing the connection of the EAP and the terminal according to various embodiments of the present disclosure. Specifically, FIG. 5B illustrates an example network architecture for performing operations shown in FIG. 5A.

Referring to FIG. 5B, the AMF may expand the CP to encompass EAPs residing in range of the base station. Although not depicted in FIG. 5B, the EAP may transmit EAP capability information to the AMF. In addition, the EAP may determine the willingness for servicing the UE, and determine whether to activate the SDR-MCT.

According to an embodiment, the AMF may bring up the dummy interface or the physical X2 interface. According to an embodiment, the AMF may instruct the base station to establish the dummy or physical X2 interface based on a number of the connected base stations. According to an embodiment, the base station may establish the X2 interface with the base station on another cell. According to an embodiment, if not reaching the base station on another cell, the base station may establish the dummy interface having itself as an end point.

According to an embodiment, the AMF may establish the X2 interface with the EAP. According to an embodiment, the AMF may instruct the base station to establish the physical X2 interface with the EAP. According to an embodiment, the base station may establish the physical X2 interface with the EAP based on an instruction received from the AMF. According to an embodiment, the base station may establish the physical X2 interface with at least one EAP residing in the base station coverage. According to an embodiment, the physical X2 interface may be a path for performing the transmission and reception related to the control and the data.

The EAP may establish the logical X2' interface with another EAP. According to an embodiment, the EAP may establish the logical X2' interface with another EAP included its range. According to an embodiment, the logical X2' interface may be a path for performing the control related transmission and reception.

According to an embodiment, the EAP may establish a connection with the terminal. According to an embodiment, the terminal may be attached to the EAP based on the instruction received from the AMF. According to an embodiment, the terminal activating a Wi-Fi function may be connected to the EAP via a Wi-Fi AP included in the EAP. According to an embodiment, the terminal deactivating a Wi-Fi function may be connected to the EAP via the entity for performing the SDR-MCT included in the EAP. According to an embodiment, the terminal activating a Wi-Fi function may include the terminal having the IMSI as the identifier or the terminal deactivating a Wi-Fi function may include the terminal having the ITSI as the identifier. Notably, the disclosure is not limited to the above described embodiments, and the EAP may include at least one of the entity for performing the SDR-MCT or the Wi-Fi AP, and adaptively establish the connection based on the characteristics of the terminal. If the connection establishment of the EAP and the terminal is completed, the terminal, which resides out of the base station coverage but is included in the coverage of the EAP, may communicate with the EAP which substantially functions the same as the base station.

According to an embodiment, if the terminal hands over between the EAPs connected via the X2' interface or if the availability and the willingness of the EAP establishing the connection with the terminal for servicing the terminal are changed, the terminal 530 may further perform the handover procedures to establish a new connection with the target EAP.

Figure 6A:
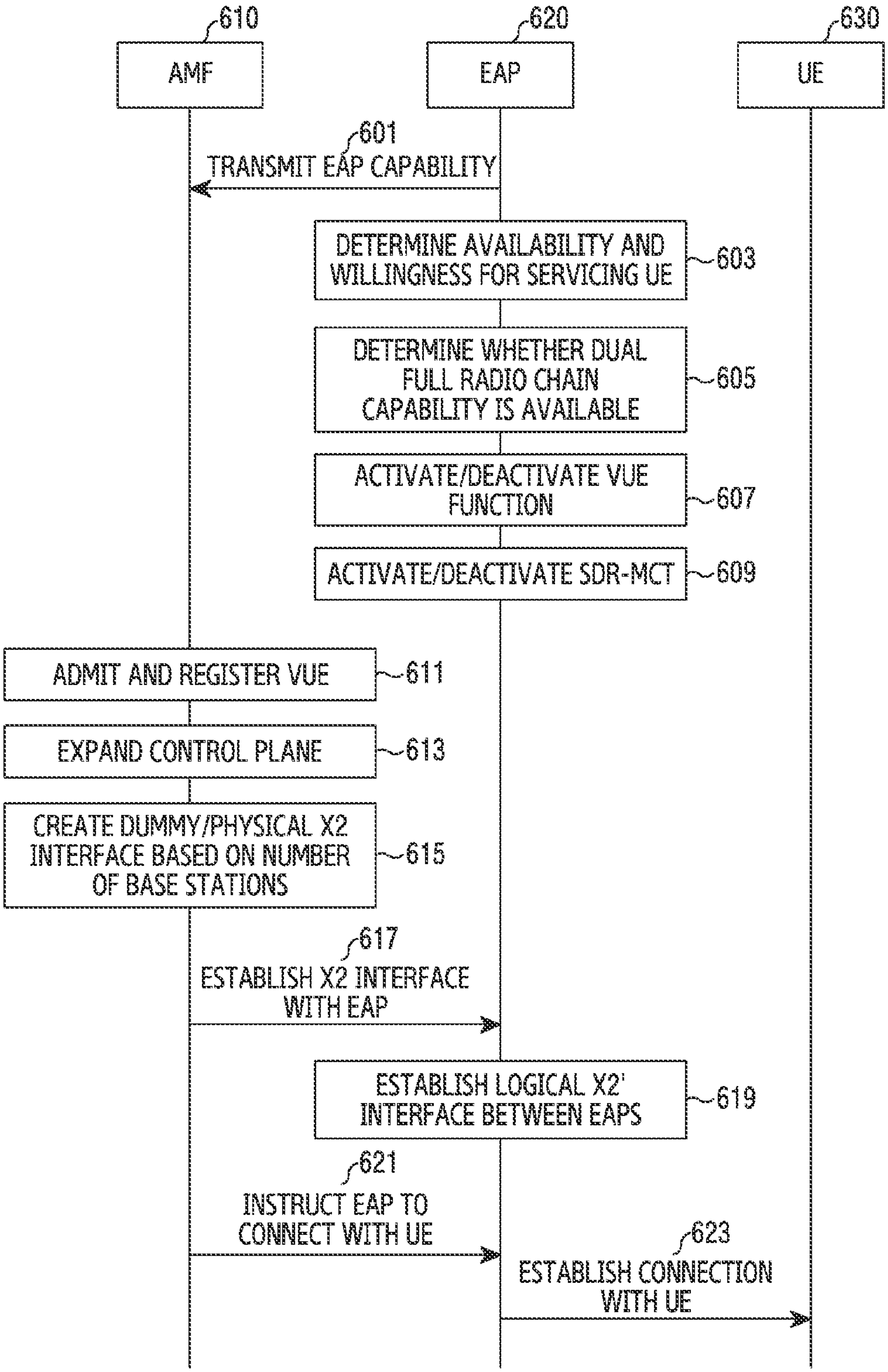
FIG. 6A illustrates example signal flows for establishing a connection of an EAP and a UE using a virtual UE (VUE) according to various embodiments.

FIG. 6A illustrates example signal flows for establishing a connection of an EAP and a UE using a virtual UE (VUE) according to various embodiments of the present disclosure. Specifically, FIG. 6A illustrates signal flows for establishing a connection of an EAP activating the VUE and the UE. Referring to FIG. 6A, an AMF 610 and an EAP 620 may transmit and receive signals via the eNB/gNB (hereafter, described as the base station). According to an embodiment, the EAP 620 may reside between the base station and the UE 630, and may differ from a simple relay device (e.g., a repeater device) in that it may perform the active control. Herein, the EAP 620 may be included in coverage of the base station, and the UE 630 may reside outside the base station coverage. According to various embodiments of the present disclosure, the order of the steps shown in FIG. 6A is merely an example, and may be performed regardless of the order of the steps. According to various embodiments, all or some of the steps or at least one of some combinations may be performed.

In step 601, the EAP 620 may transmit EAP capability related information to the AMF 610. More specifically, according to an embodiment, the EAP 620 may trigger the AMF 610 to identify the EAP capability related information through advertising. Advertising may, for example, refer to a method for transmitting a signal without designating a specific entity, and may, for example, refer to a scheme of periodically transmitting a signal regardless of the connection. According to an embodiment, the AMF 610 may identify the EAP capability related information through polling. Polling may, for example, refer to a scheme in which one device periodically examines the state of other device for the sake of the synchronization processing, and transmits and receives with the other device, if a specific condition is satisfied. According to an embodiment, the AMF 610 receiving the EAP capability related information may determine availability of the signal transmission via the EAP 620. According to an embodiment, the AMF 610 receiving the EAP capability related information may determine the availability of the signal transmission via the EAP 620, based on the EAP capability related information received from the EAP 620.

In step 603, the EAP 620 may determine willingness for servicing an IMSI/ITSI compliant UE 630 (hereafter, described as a terminal). The IMSI may, for example, refer to a unique ID for identifying the mobile communication subscriber around the world. The format of the IMSI may include the PLMN ID and the MSIN, the PLMN ID may, for example, refer to an ID for identifying the communication provider around the world, and the MSIN may, for example, refer to a unique ID for identifying a subscriber in a corresponding communication provider. The ITSI may, for example, refer to a unique ID for identifying a tetra system subscriber. The format of the ITSI may include the (T)MCC, the (T)MNC and the ISSI. According to an embodiment, the EAP 620 may identify the terminal 630 in the coverage of the EAP 620, and determine whether to service the identified terminal 630.

In step 605, the EAP 620 may determine whether dual full radio chain capability (e.g., a dual subscriber identity module (SIM)) is available. According to an embodiment, if a dual ID of the EAP 620 is available, the EAP 620 may notify the base station or the AMF 610 of the dual full radio chain available.

In step 607, the EAP 620 may determine whether to activate VUE capability. According to an embodiment, the EAP 620 may determine whether to activate VUE functionality. According to an embodiment, the AMF 610 may instruct the EAP 620 to activate the VUE capability. According to an embodiment, the EAP 620 determining to activate the VUE capability may virtualize the EAP VUE. The activated VUE function entity may perform the same operation as the EAP 620. According to an embodiment, in the following steps, the EAP 620 may, for example, refer to the EAP 620 itself according to the conducted operation or the VUE activated by the EAP 620. According to an embodiment, the EAP 620 may include the activated VUE.

In step 609, the EAP 620 may determine whether to activate the SDR-MCT. According to an embodiment, the EAP 620 may determine whether to activate the SDR-MCT based on at least one of whether the EAP capability related information is transmitted or whether the willingness for servicing the terminal 630 is determined. The SDR may, for example, refer to technology for processing modulation or demodulation in software in the wireless communication. According to an embodiment, the EAP 620 may translate modulation and code of a signal to transmit to the terminal 630 or a signal received from the terminal 630 using the SDR technology based on a tunable filter and a software codec.

In step 611, the AMF 610 providing the EAP 620 may admit the activated VUE and perform registration. According to an embodiment, the AMF 610 may admit the VUE included in the EAP 620 through the CP. According to an embodiment, the AMF 610 may register the VUE activated through the CP on the core network. According to an embodiment, the AMF 610 may determine whether the dual full radio chain function (e.g., the dual SIM) is supported. If the dual full radio chain function is supported, the AMF 610 may generate a user plane path for transmitting and receiving data to and from the EAP 620 and the VUE activated by the EAP 620. According to an embodiment, the AMF 610 may arrange a target EAP (e.g., establish a connection with a target EAP) in a target cell in which handover is conducted, for a handover situation of the terminal 630.

In step 613, the AMF 610 may expand the CP. According to an embodiment, the AMF 610 may expand the CP to encompass EAPs residing in the coverage of each base station. According to an embodiment, the AMF 610 may include the activated VUE. According to an embodiment, the AMF 610 may expand the CP to encompass the EAP 620 determining the willingness for servicing the terminal 630. According to an embodiment, the AMF 610 may instruct the base station to expand the CP to include the EAP 620 determining the willingness for servicing the terminal 630.

In step 615, the AMF 610 may bring up the dummy interface or the physical X2 interface. According to an embodiment, the AMF 610 may instruct the base station to establish the dummy or physical X2 interface based on a number of base stations connected. According to an embodiment, the base station may establish the X2 interface with a base station on another cell. According to an embodiment, if not reaching the base station on the other cell, the base station may establish the dummy interface having itself as an end point.

In step 617, the AMF 610 may establish the X2 interface with the EAP 620. According to an embodiment, the AMF 610 may instruct the base station to establish the physical X2 interface with the EAP 620. According to an embodiment, the EAP 620 may include the activated VUE. According to an embodiment, the base station may establish the physical X2 interface with the EAP 620 based on the instruction received from the AMF 610. According to an embodiment, the base station may establish the physical X2 interface with at least one EAP 620 residing in the base station coverage. According to an embodiment, the physical X2 interface may, for example, be a path for performing transmission and reception related to the control and the data.

In step 619, the EAP 620 may establish a logical X2' interface with another EAP. According to an embodiment, the EAP 620 may establish the logical X2' interface with another EAP included its range. According to an embodiment, the logical X2' interface may, for example, be a path for performing control related transmission and reception. According to an embodiment, the EAP 620 may establish an interface connection which ends at the VUE included in another EAP.

In step 621, the AMF 610 may instruct the EAP 620 to establish a connection with the terminal 630. According to an embodiment, based on the instruction of the AMF 610, the terminal 630 activating a Wi-Fi function may be connected with the EAP 620 via a Wi-Fi AP included by the EAP 620. According to an embodiment, based on the instruction of the AMF 610, the terminal 630 deactivating a Wi-Fi function may be connected with the EAP 620 via an entity which performs the SDR-MCT included by the EAP 620. According to an embodiment, based on the instruction of the AMF 610, the terminal 630 activating a Wi-Fi function may include the terminal 630 having the IMSI as the identifier or the terminal 630 deactivating a Wi-Fi function may include the terminal 630 having the ITSI as the identifier. Notably, the disclosure is not limited to the above described embodiments, and the EAP 620 may include at least one of the entity performing the SDR-MCT or the Wi-Fi AP, and adaptively establish the connection based on characteristics of the terminal 630. According to an embodiment, if the VUE included in the EAP 620 is activated, the Wi-Fi AP may be connected to the EAP 620 or the entity performing the SDR-MCT may be connected to the VUE included in the EAP 620. Notably, the above embodiments are by way of example and not limited to thereto, and the terminal 630 may be connected to the EAP 620 or the VUE included in the EAP 620 via the Wi-Fi AP or the SDR-MCT.

In step 623, the EAP 620 may establish the connection with the terminal 630. According to an embodiment, the terminal 630 may be attached to the EAP 620 based on the instruction received from the AMF 610. According to an embodiment, the terminal 630 activating a Wi-Fi function may be connected to the EAP 620 via the Wi-Fi AP included in the EAP 620. According to an embodiment, the terminal 630 deactivating a Wi-Fi function may be connected to the EAP 620 via the entity performing the SDR-MCT included in the EAP 620. According to an embodiment, the terminal 630 activating a Wi-Fi function may include the terminal 630 having the IMSI as the identifier or the terminal 630 deactivating a Wi-Fi function may include the terminal 630 having the ITSI as the identifier. Notably, the disclosure is not limited to the above described embodiments, and the EAP 620 may include at least one of the entity performing the SDR-MCT or the Wi-Fi AP, and adaptively establish the connection based on the characteristics of the terminal 630. If the connection establishment of the EAP 620 and the terminal 630 is completed, the terminal 630, which resides out of the base station coverage but is included in the coverage of the EAP 620, may communicate with the EAP 620 which substantially functions the same as the base station. According to an embodiment, if the VUE included in the EAP 620 is activated, the Wi-Fi AP may be connected to the EAP 620 or the entity performing the SDR-MCT may be connected to the VUE included in the EAP 620. Notably, the above embodiments are by way of example and not limited to thereto, and the terminal 630 may be connected to the EAP 620 or the VUE included in the EAP 620 via the Wi-Fi AP or the SDR-MCT.

Although not depicted in FIG. 6A, if the terminal 630 hands over between the EAPs connected via the X2' interface or if the availability and the willingness of the EAP 620 establishing the connection with the terminal 630 for servicing the terminal 630 are changed, the terminal 630 may further perform the following steps to establish a new connection with a target EAP. According to an embodiment, if the terminal 630 performs the handover, a spatial based pilot allocation (SBPA) scheme may be used. The SBPA scheme may, for example, refer to a scheme which applies sparsity of multiple multiple-input multiple-output (MIMO) channels and allocates the same orthogonal pilots to non-overlapping terminals for the consistent data transmission based on an angle of arrival and angular spread of a pilot signal received in a compressed sensing scheme. Hence, by performing the SBPA scheme, the terminal 630 may establish the new connection with the target EAP without being affected from access contention with other terminals.

The terminal 630 may obtain consent for the handover from the target EAP and the connected AMF 610. According to an embodiment, the terminal 630 may transmit a measurement report to the connected EAP 620. The EAP 620 receiving the measurement report from the terminal 630 may identify the required handover of the terminal 630. According to an embodiment, if identifying the required handover of the terminal 630, the EAP 620 may notify the AMF 610 of terminal handover related information. Based on this, the AMF 610 may identify the terminal handover required between the EAPs, and transmit its consent. According to an embodiment, the EAP 620 connected with the terminal 630 may transmit the handover related information to the target EAP. According to an embodiment, the EAP 620 connected with the terminal 630 may transmit the handover related information to the target EAP via the logical X2' interface. If obtaining the consent from both the target EAP and the AMF 610, the terminal 630 may successfully establish the new connection with the target EAP.

If the terminal 630 does not obtain the consent from at least one of the target EAP and the AMF 610, the AMF 610 may arrange a new EAP connection for servicing the terminal 630. Arranging the new EAP connection at the AMF 610 may be carried out by various embodiments of the present disclosure described earlier. According to an embodiment, as illustrated in FIG. 3, the connection establishment process between the new EAP, the terminal 630 and the core network (e.g., the AMF 610) may be conducted, to instantiate the cooperative transmission.

Figure 6B:
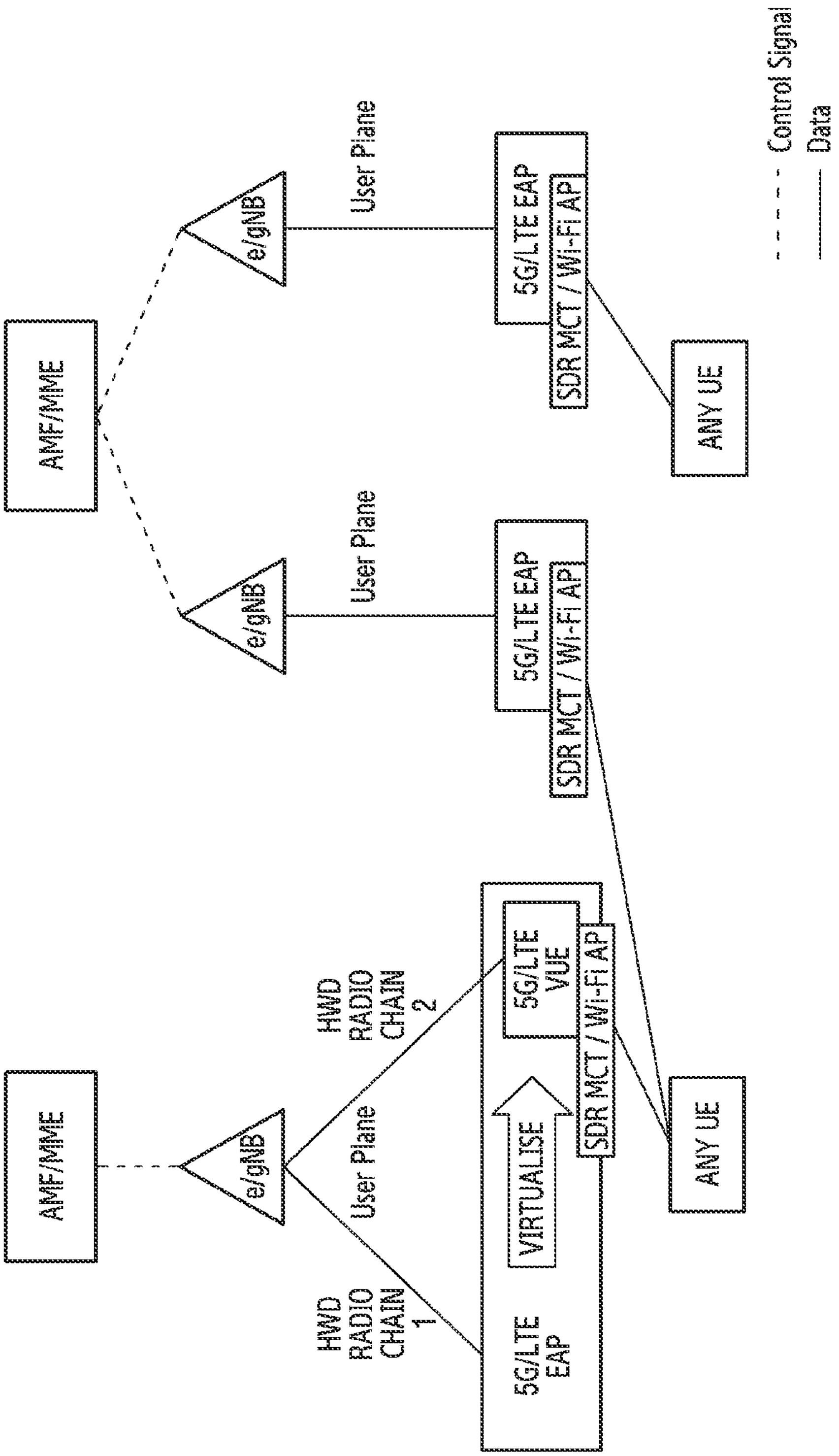
FIG. 6B illustrates an example network architecture for establishing a connection of an EAP and a UE using a VUE according to various embodiments.

FIG. 6B illustrates an example network architecture for establishing the connection of the EAP and the terminal using the VUE according to various embodiments of the present disclosure. Specifically, FIG. 6B illustrates an example network architecture for performing the operations shown in FIG. 6A.

Referring to FIG. 6B, the AMF may expand the CP to encompass EAPs residing in the range of the base station. Although not depicted in FIG. 6B, the EAP may transmit the EAP capability information to the AMF. In addition, the EAP may determine the willingness for servicing the terminal, and determine whether to activate the SDR-MCT.

According to an embodiment, the EAP may determine whether the dual full radio chain capability (e.g., a dual SIM) is available.

According to an embodiment, the EAP determining to activate the VUE function may virtualize the EAP VUE. The activated VUE function entity may perform the same operation as the EAP. According to an embodiment, the EAP for using the dual full radio chain capability may connect the EAP and the VUE with the base station using dual full radio chains.

Although not depicted in FIG. 6B, according to an embodiment, the base station may establish the X2 interface with the base station on another cell. According to an embodiment, if not reaching the base station on the other cell, the base station may establish the dummy interface having itself as an end point. According to an embodiment, the AMF may establish the X2 interface with the EAP. According to an embodiment, the EAP may establish the logical X2' interface with another EAP.

According to an embodiment, the EAP may establish a connection with the terminal. According to an embodiment, the terminal may be attached to the EAP based on the instruction received from the AMF. According to an embodiment, the terminal activating a Wi-Fi function may be connected to the EAP via the Wi-Fi AP included in the EAP. According to an embodiment, the terminal deactivating a Wi-Fi function may be connected to the EAP via the entity for performing the SDR-MCT included in the EAP. According to an embodiment, the terminal activating a Wi-Fi function may include the terminal having the IMSI as the identifier or the terminal deactivating a Wi-Fi function may include the terminal having the ITSI as the identifier. Notably, the disclosure is not limited to the above described embodiments, and the EAP may include at least one of the entity for performing the SDR-MCT or the Wi-Fi AP, and adaptively establish the connection based on the characteristics of the terminal. If the connection establishment of the EAP and the terminal is completed, the terminal, which resides out of the base station coverage but is included in the EAP coverage, may communicate with the EAP which substantially functions the same as the base station.

According to an embodiment, if the terminal hands over between the EAPs connected via the X2' interface or if the availability and the willingness of the EAP establishing the connection with the terminal for servicing the terminal are changed, the terminal may further perform the handover procedures to establish a new connection with the target EAP.

Figure 7A:
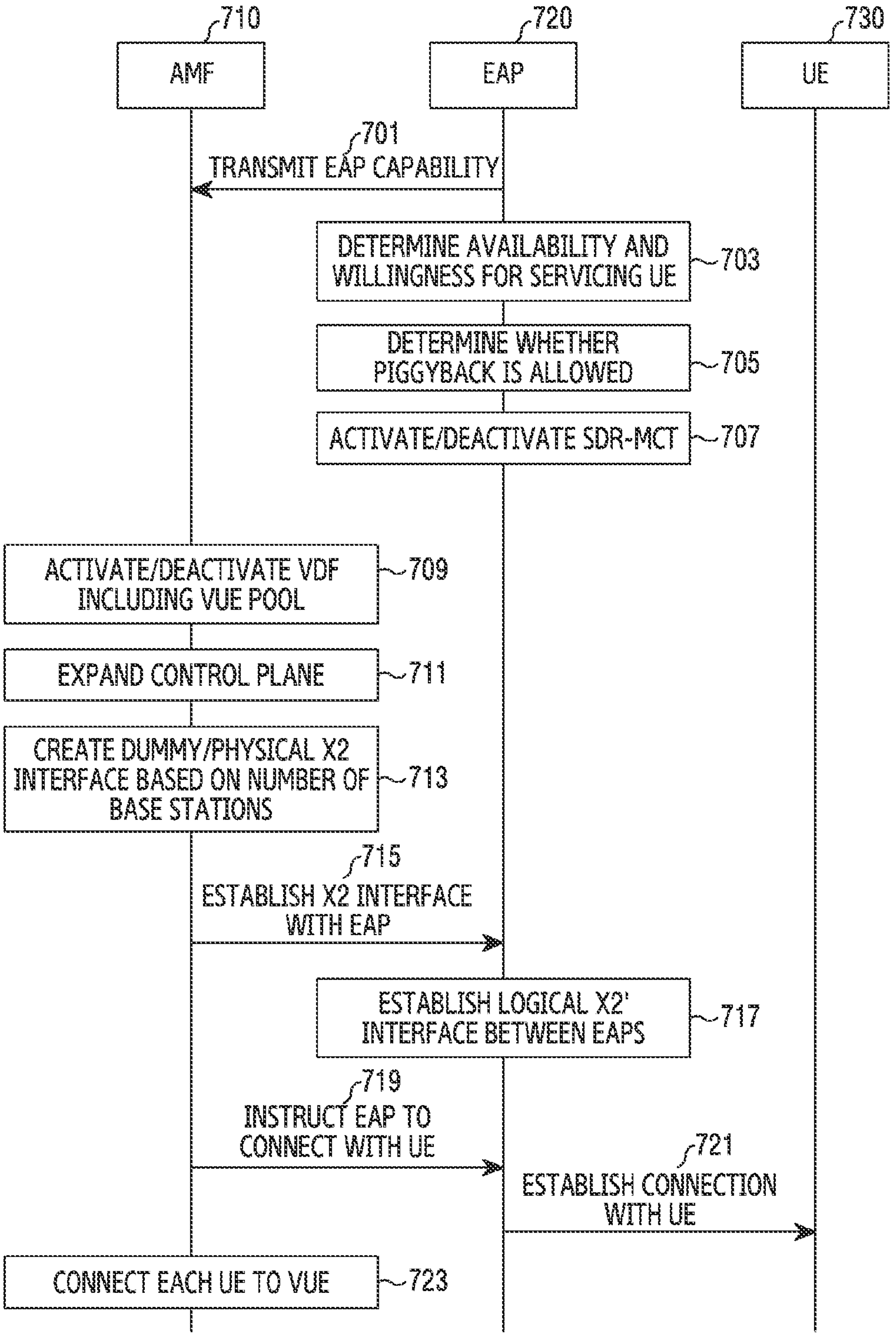
FIG. 7A illustrates example signal flows for establishing a connection of an EAP and a UE if piggyback is allowed according to various embodiments.

FIG. 7A illustrates example signal flows for establishing a connection of an EAP and a UE if piggyback is allowed according to various embodiments of the present disclosure. Specifically, FIG. 7A illustrates example signal flows for establishing the connection of the EAP and the UE, if the piggyback over the CP is allowed. Referring to FIG. 7A, an AMF 710 and an EAP 720 may transmit and receive signals via the eNB/gNB (hereafter, referred to as the base station). According to an embodiment, the EAP 720 may reside between the base station and the UE 730, and may differ from a simple relay device (e.g., a repeater device) in that it may perform the active control. Herein, the EAP 720 may be included in coverage of the base station, and the UE 730 may reside outside the base station coverage. According to various embodiments of the present disclosure, the order of the steps shown in FIG. 7A is merely an example, and may be performed regardless of the order of the steps according to the technical level of those skilled in the art. According to various embodiments, all or some of the steps or at least one of some combinations may be performed.

In step 701, the EAP 720 may transmit EAP capability related information to the AMF 710. More specifically, according to an embodiment, the EAP 720 may trigger the AMF 710 to identify the EAP capability related information through advertising. Advertising may, for example, refer to a method for transmitting a signal without designating a specific entity, and may, for example, refer to a scheme of periodically transmitting a signal regardless of the connection. According to an embodiment, the AMF 710 may identify the EAP capability related information through polling. Polling may, for example, refer to a scheme in which one device periodically examines the state of other device for the sake of the synchronization processing, and transmits and receives with the other device, if a specific condition is satisfied. According to an embodiment, the AMF 710 receiving the EAP capability related information may determine availability of the signal transmission via the EAP 720. According to an embodiment, the AMF 710 receiving the EAP capability related information may determine the availability of the signal transmission via the EAP 720, based on the EAP capability related information received from the EAP 720.

In step 703, the EAP 720 may determine willingness for servicing an IMSI/ITSI compliant UE 730 (hereafter, described as the terminal). The IMSI may, for example, refer to a unique ID for identifying the mobile communication subscriber around the world. The format of the IMSI may include the PLMN ID and the MSIN, the PLMN ID may, for example, refer to an ID for identifying the communication provider around the world, and the MSIN may, for example, refer to a unique ID for identifying a system subscriber in a corresponding communication provider. The ITSI may, for example, refer to a unique ID for identifying a tetra system subscriber. The format of the ITSI may include the (T)MCC, the (T)MNC and the ISSI. According to an embodiment, the EAP 720 may identify the terminal 730 in the coverage of the EAP 720, and determine whether to service the identified terminal 730.

In step 705, the EAP 720 may identify whether the piggyback over the CP is allowed. Piggyback may, for example, refer to an error control scheme in which a signal receiving side transmits a transmit data frame by adding an acknowledgement field only if there is data to retransmit, without immediately transmitting an acknowledgement response of data received and using a separate control frame. According to an embodiment, the EAP 720 may determine whether the EAP 720 supports the piggyback function or the base station connected with the EAP 720 supports the piggyback function.

In step 707, the EAP 720 may determine whether to activate the SDR-MCT. According to an embodiment, the EAP 720 may determine whether to activate the SDR-MCT based on at least one of whether the EAP capability related information is transmitted or whether the willingness for servicing the terminal 730 is determined. The SDR may, for example, refer to technology for processing the modulation or the demodulation in software in wireless communication. According to an embodiment, the EAP 720 may translate modulation and code of a signal to transmit to the terminal 730 or a signal received from the terminal 730 using the SDR technology based on a tunable filter and a software codec.

In step 709, the AMF 710 may determine whether to activate a virtual device function (VDF) to include a VUE pool including a plurality of VUEs. According to an embodiment, the AMF 710 may create each VUE for the terminal 730 to be attempted for the connection establishment in the VDF pool. According to an embodiment, the AMF 710 may ensure data transmitted to VUEs which imitate physical connection end points. Also, the AMF 710 may control to execute the VUE within the CP. According to an embodiment, the base station connected with the AMF 710 and the EAP 720 may perform the piggyback function.

In step 711, the AMF 710 may expand the CP. According to an embodiment, the AMF 710 may expand the CP to encompass EAPs residing in the coverage of each base station. According to an embodiment, the AMF 710 may expand the CP to encompass the EAP 720 determining the willingness for servicing the terminal 730. According to an embodiment, the AMF 710 may instruct the base station to expand the CP to include the EAP 720 determining the willingness for servicing the terminal 730.

In step 713, the AMF 710 may bring up the dummy interface or the physical X2 interface. According to an embodiment, the AMF 710 may instruct the base station to establish the dummy or physical X2 interface based on a number of base stations connected. According to an embodiment, the base station may establish the X2 interface with a base station on another cell. According to an embodiment, if not reaching the base station on the other cell, the base station may establish the dummy interface having itself as an end point.

In step 715, the AMF 710 may establish the X2 interface with the EAP 720. According to an embodiment, the AMF 710 may instruct the base station to establish the physical X2 interface with the EAP 720. According to an embodiment, the base station may establish the physical X2 interface with the EAP 720 based on the instruction received from the AMF 710. According to an embodiment, the base station may establish the physical X2 interface with at least one EAP 720 residing in the base station coverage. According to an embodiment, the physical X2 interface may be a path for performing control and data related transmission and reception.

In step 717, the EAP 720 may establish the logical X2' interface with another EAP. According to an embodiment, the EAP 720 may establish the logical X2' interface with another EAP included its range. According to an embodiment, the logical X2' interface may be a path for performing control related transmission and reception.

In step 719, the AMF 710 may instruct the EAP 720 to establish a connection with the terminal 730. According to an embodiment, based on the instruction of the AMF 710, the terminal 730 activating the Wi-Fi function may be connected with the EAP 720 via a Wi-Fi AP included by the EAP 720. According to an embodiment, based on the instruction of the AMF 710, the terminal 730 deactivating a Wi-Fi function may be connected with the EAP 720 via an entity for performing the SDR-MCT included by the EAP 720. According to an embodiment, based on the instruction of the AMF 710, the terminal 730 activating a Wi-Fi function may include the terminal 730 having the IMSI as the identifier or the terminal 730 deactivating a Wi-Fi function may include the terminal 730 having the ITSI as the identifier. Notably, the disclosure is not limited to the above described embodiments, and the EAP 720 may include at least one of the entity for performing the SDR-MCT or the Wi-Fi AP, and adaptively establish the connection based on characteristics of the terminal 730.

In step 721, the EAP 720 may establish the connection with the terminal 730. According to an embodiment, the terminal 730 may be attached to the EAP 720 based on the instruction received from the AMF 710. According to an embodiment, the terminal 730 activating the Wi-Fi function may be connected to the EAP 720 via the Wi-Fi AP included in the EAP 720. According to an embodiment, the terminal 730 deactivating a Wi-Fi function may be connected to the EAP 720 via the entity for performing the SDR-MCT included in the EAP 720. According to an embodiment, the terminal 730 activating a Wi-Fi function may include the terminal 730 having the IMSI as the identifier or the terminal 730 deactivating a Wi-Fi function may include the terminal 730 having the ITSI as the identifier. Notably, the disclosure is not limited to the above described embodiments, and the EAP 720 may include at least one of the entity for performing the SDR-MCT or the Wi-Fi AP, and adaptively establish the connection based on the characteristics of the terminal 730. If the connection establishment of the EAP 720 and the terminal 730 is completed, the terminal 730, which resides out of the base station coverage but is included in the coverage of the EAP 720, may communicate with the EAP 720 which functions substantially the same as the base station.

In step 723, the AMF 710 may establish connections of terminals corresponding to the VUEs respectively, to the VUEs contained in the VDF connected with the AMF 710. For example, if the VDF includes a first VUE and a second VUE, the ITSI terminal 730 may be connected to the first VUE via the entity which performs the SDR-MCT function, and the IMSI terminal 730 may be connected to the second VUE via the Wi-Fi AP. As described above, the VDF may include the VUEs corresponding to the terminals connected to the EAPs respectively, and the AMF 710 may establish connections for the terminal 710 and the VUEs.

Although not depicted in FIG. 7A, if the terminal 730 hands over between the EAPs connected via the X2' interface or if the availability and the willingness of the EAP 720 establishing the connection with the terminal 730 for servicing the terminal 730 are changed, the terminal 730 may further perform the following steps to establish a new connection with a target EAP. According to an embodiment, if the terminal 730 performs the handover, the SBPA scheme may be used. The SBPA scheme may, for example, refer to a scheme which applies the sparsity of multiple MIMO channels and allocates the same orthogonal pilots to non-overlapping terminals for the consistent data transmission based on the angle of arrival and the angular spread of a pilot signal received in the compressed sensing scheme. Hence, by performing the SBPA scheme, the terminal 730 may establish the new connection with the target EAP without being affected from access contention with other terminals.

The terminal 730 may obtain consent for the handover from the target EAP and the connected AMF 710. According to an embodiment, the terminal 730 may transmit a measurement report to the connected EAP 720. The EAP 720 receiving the measurement report from the terminal 730 may identify the required handover of the terminal 730. According to an embodiment, if identifying the required handover of the terminal 730, the EAP 720 may notify the AMF 710 of terminal handover related information. Based on this, the AMF 710 may identify the terminal handover required between the EAPs, and transmit its consent. According to an embodiment, the EAP 720 connected with the terminal 730 may transmit the handover related information to the target EAP. According to an embodiment, the EAP 720 connected with the terminal 730 may transmit the handover related information to the target EAP via the logical X2' interface. If obtaining the consent from both the target EAP and the AMF 710, the terminal 730 may successfully establish the new connection with the target EAP. To perform the handover between different EAPs, the terminal 730 may apply the physical X2' interface between the existing EAP 720 and the target EAP, and use the VUEs included in the VDF. For example, if the terminal attempts the handover to the target EAP, the AMF 710 may control to connect the terminal 730 handing over to the VUE connected to the target EAP using the CP.

If the terminal 730 does not obtain the consent from at least one of the target EAP and the AMF 710, the AMF 710 may arrange a new EAP for servicing the terminal 730. Arranging the new EAP at the AMF 710 may be carried out by various embodiments of the present disclosure described earlier. According to an embodiment, as illustrated in FIG. 3, the connection establishment process between the new EAP, the terminal 730 and the core network (e.g., the AMF 710) may be conducted, to instantiate the cooperative transmission.

Figure 7B:
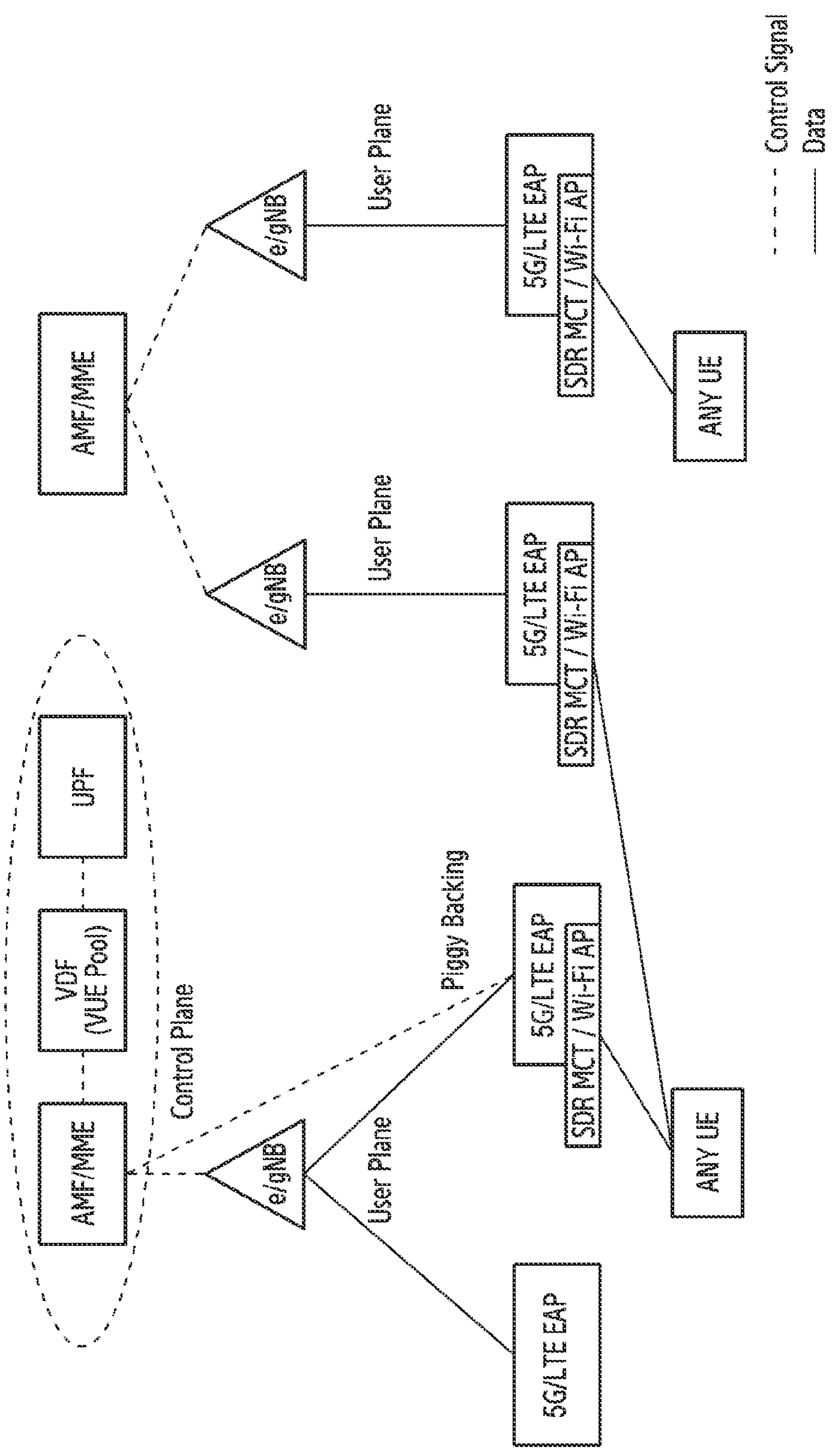
FIG. 7B illustrates an example network architecture for establishing a connection of an EAP and a UE if piggyback is allowed according to various embodiments.

FIG. 7B illustrates an example network architecture for establishing the connection of the EAP and the terminal if piggyback is allowed according to various embodiments of the present disclosure. Specifically, FIG. 7B illustrates an example network architecture for performing the operations shown in FIG. 7A.

Referring to FIG. 7B, the AMF may expand the CP to encompass EAPs residing in the range of the base station. Although not depicted in FIG. 7B, the EAP may transmit the EAP capability information to the AMF. In addition, the EAP may determine the willingness for servicing the terminal, and determine whether to activate the SDR-MCT.

According to an embodiment, the EAP may identify whether the piggyback over the CP is allowed. According to an embodiment, the AMF may determine whether to activate the VDF to include the VUE pool including a plurality of VUEs. According to an embodiment, the AMF may create VUEs for the terminals respectively to be attempted for the connection establishment in the VDF pool. According to an embodiment, the AMF may ensure data transmitted to VUEs which imitate the physical connection end points.

Although not depicted in FIG. 7B, according to an embodiment, the base station may establish the X2 interface with the base station on another cell. According to an embodiment, if not reaching the base station on the other cell, the base station may establish the dummy interface having itself as the end point. According to an embodiment, the AMF may establish the X2 interface with the EAP. According to an embodiment, the EAP may establish the logical X2' interface with another EAP.

According to an embodiment, the EAP may establish a connection with the terminal. According to an embodiment, the terminal may be attached to the EAP based on the instruction received from the AMF. According to an embodiment, the terminal activating the Wi-Fi function may be connected to the EAP via the Wi-Fi AP included in the EAP. According to an embodiment, the terminal deactivating a Wi-Fi function may be connected to the EAP via the entity for performing the SDR-MCT included in the EAP. According to an embodiment, the terminal activating a Wi-Fi function may include the terminal having the IMSI as the identifier or the terminal deactivating a Wi-Fi function may include the terminal having the ITSI as the identifier. Notably, it is not limited to the above described embodiments, and the EAP may include at least one of the entity for performing the SDR-MCT or the Wi-Fi AP, and adaptively establish the connection based on the characteristics of the terminal. If the connection establishment of the EAP and the terminal is completed, the terminal, which resides out of the base station coverage but is included in the coverage of the EAP, may communicate with the EAP which functions substantially the same as the base station.

According to an embodiment, if the terminal hands over between the EAPs connected via the X2' interface or if the availability and the willingness of the EAP establishing the connection with the terminal for servicing the terminal are changed, the terminal 730 may further perform the handover procedures to establish a new connection with the target EAP.

Figure 8A:
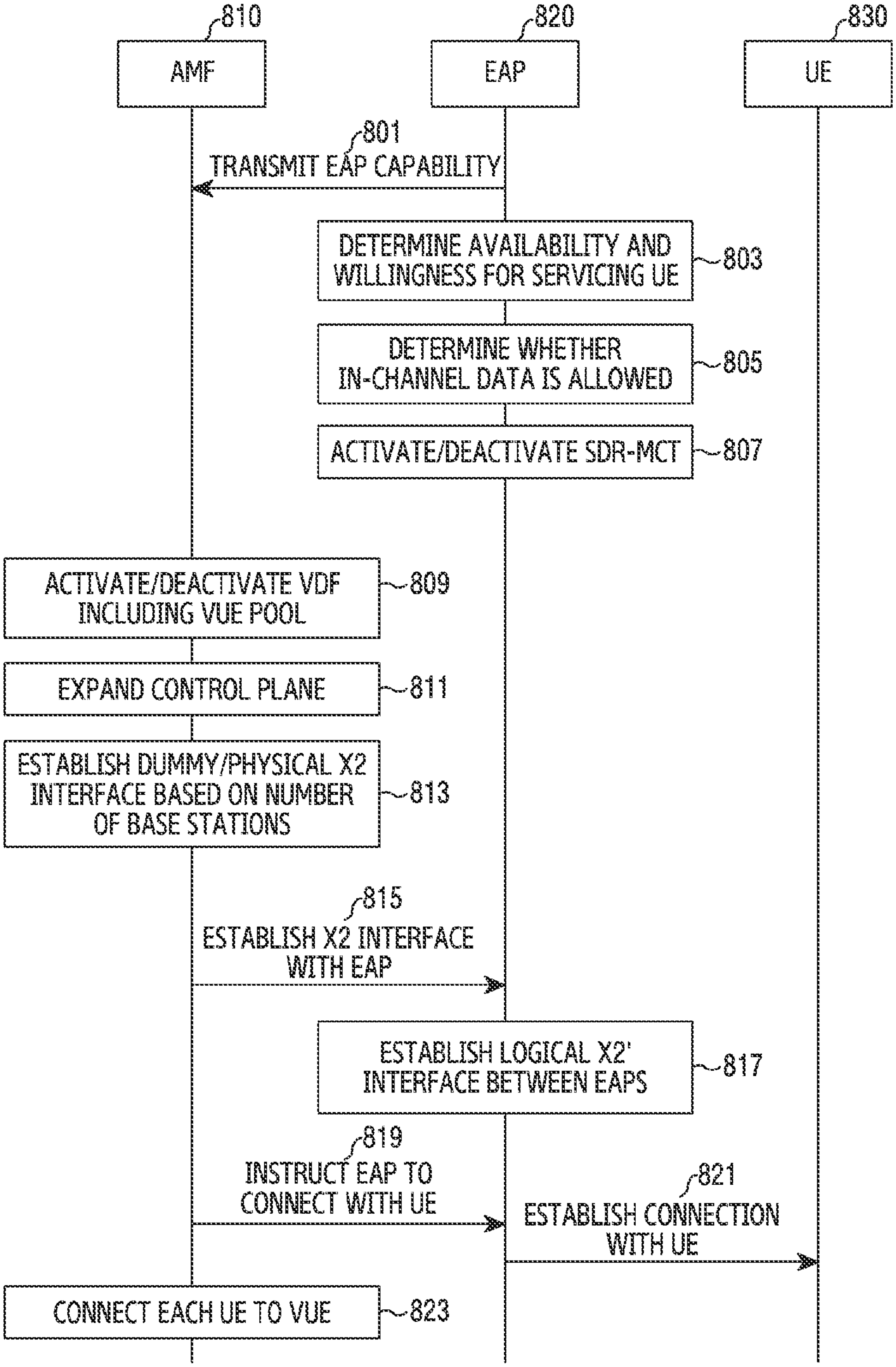
FIG. 8A illustrates example signal flows for establishing a connection of an EAP and a UE if in-channel data is allowed according to various embodiments.

FIG. 8A illustrates example signal flows for establishing a connection of an EAP and a UE if in-channel data is allowed according to various embodiments of the present disclosure. Specifically, FIG. 8A illustrates example signal flows for establishing the connection of the EAP and the UE, if the in-channel data over the user plane (UP) is allowed. Referring to FIG. 8A, an AMF 810 and an EAP 820 may transmit and receive signals via the eNB/gNB (hereafter, referred to as the base station). According to an embodiment, the EAP 820 may reside between the base station and the UE 830, and may differ from a simple relay device (e.g., a repeater device) in that it may perform the active control. Herein, the EAP 820 may be included in coverage of the base station, and the UE 830 may reside outside the base station coverage. According to various embodiments of the present disclosure, the order of the steps shown in FIG. 8A is merely an example, and may be performed regardless of the order of the steps. According to various embodiments, all or some of the steps or at least one of some combinations may be performed.

In step 801, the EAP 820 may transmit EAP capability related information to the AMF 810. More specifically, according to an embodiment, the EAP 820 may trigger the AMF 810 to identify the EAP capability related information through the advertising. Advertising may, for example, refer to a method for transmitting a signal without designating a specific entity, and may refer to a scheme of periodically transmitting a signal regardless of the connection. According to an embodiment, the AMF 810 may identify the EAP capability related information through polling. Polling may refer, for example, to a scheme in which one device periodically examines the state of another device for the sake of the synchronization processing, and transmits and receives with the other device, if a specific condition is satisfied. According to an embodiment, the AMF 810 receiving the EAP capability related information may determine availability of the signal transmission via the EAP 820. According to an embodiment, the AMF 810 receiving the EAP capability related information may determine the signal transmission availability via the EAP 820, based on the EAP capability related information received from the EAP 820.

In step 803, the EAP 820 may determine availability and willingness for servicing an IMSI/ITSI compliant UE 830 (hereafter, described as the terminal). The IMSI may, for example, refer to a unique ID for identifying the mobile communication subscriber around the world. The format of the IMSI may include the PLMN ID and the MSIN, the PLMN ID may, for example, refer to an ID for identifying the communication provider around the world, and the MSIN may, for example, refer to a unique ID for identifying a system subscriber in a corresponding communication provider. The ITSI may, for example, refer to a unique ID for identifying a tetra system subscriber. The format of the ITSI may include the (T)MCC, the (T)MNC and the ISSI. According to an embodiment, the EAP 820 may identify the terminal 830 in the coverage of the EAP 820, and determine whether to service the identified terminal 830.

In step 805, the EAP 820 may identify whether an in-channel data may be transmitted or received over the UP. According to an embodiment, the EAP 820 may determine whether the EAP 820 may transmit and receive the in-channel data over the UP or whether the base station connected to the EA 820 may transmit and receive the in-channel data over the UP.

In step 807, the EAP 820 may determine whether to activate the SDR-MCT. According to an embodiment, the EAP 820 may determine whether to activate the SDR-MCT based on at least one of whether the EAP capability related information is transmitted or whether the willingness for servicing the terminal 830 is determined. The SDR may, for example, refer to technology for processing modulation or demodulation in software in the wireless communication. According to an embodiment, the EAP 820 may translate the modulation and the coding of a signal to transmit to the terminal 830 or a signal received from the terminal 830 using the SDR technology based on a tunable filter and a software codec.

In step 809, the AMF 810 may determine whether to activate a VDF to include a VUE pool including a plurality of VUEs. According to an embodiment, the AMF 810 may create VUEs for the terminals 830 respectively to be attempted for the connection establishment in the VDF pool. According to an embodiment, the AMF 810 may ensure that data is looped back in the VDF including the VUEs which imitate physical connection end points. Also, the AMF 810 may control to execute the VUE within the CP. According to an embodiment, the base station connected with the AMF 810 and the EAP 820 may transmit and receive the in-channel data over the UP. According to an embodiment, the AMF 810 may be connected to the VDF via the SMF and the PCF.

In step 811, the AMF 810 may expand the CP. According to an embodiment, the AMF 810 may expand the CP to encompass EAPs residing in the coverage of each base station. According to an embodiment, the AMF 810 may expand the CP to encompass the EAP 820 determining the willingness for servicing the terminal 830. According to an embodiment, the AMF 810 may instruct the base station to expand the CP to include the EAP 820 determining the willingness for servicing the terminal 830.

In step 813, the AMF 810 may bring up the dummy interface or the physical X2 interface. According to an embodiment, the AMF 810 may instruct the base station to establish the dummy or physical X2 interface based on a number of base stations connected. According to an embodiment, the base station may establish the X2 interface with a base station on another cell. According to an embodiment, if not reaching the base station on the other cell, the base station may establish the dummy interface having itself as an end point.

In step 815, the AMF 810 may establish the X2 interface with the EAP 820. According to an embodiment, the AMF 810 may instruct the base station to establish the physical X2 interface with the EAP 820. According to an embodiment, the base station may establish the physical X2 interface with the EAP 820 based on the instruction received from the AMF 810. According to an embodiment, the base station may establish the physical X2 interface with at least one EAP 820 residing in the base station coverage. According to an embodiment, the physical X2 interface may be a path for performing control and data related transmission and reception.

In step 817, the EAP 820 may establish the logical X2' interface with another EAP. According to an embodiment, the EAP 820 may establish the logical X2' interface with another EAP included its range. According to an embodiment, the logical X2' interface may be a path for performing control related transmission and reception.

In step 819, the AMF 810 may instruct the EAP 820 to establish a connection with the terminal 830. According to an embodiment, based on the instruction of the AMF 810, the terminal 830 activating a Wi-Fi function may be connected with the EAP 820 via a Wi-Fi AP included in the EAP 820. According to an embodiment, based on the instruction of the AMF 810, the terminal 830 deactivating a Wi-Fi function may be connected with the EAP 820 via the entity for performing the SDR-MCT included in the EAP 820. According to an embodiment, based on the instruction of the AMF 810, the terminal 830 activating a Wi-Fi function may include the terminal 830 having the IMSI as the identifier or the terminal 830 deactivating a Wi-Fi function may include the terminal 830 having the ITSI as the identifier. Notably, the disclosure is not limited to the above described embodiments, and the EAP 820 may include at least one of the entity for performing the SDR-MCT or the Wi-Fi AP, and adaptively establish the connection based on characteristics of the terminal 830.

In step 821, the EAP 820 may establish the connection with the terminal 830. According to an embodiment, the terminal 830 may be attached to the EAP 820 based on the instruction received from the AMF 810. According to an embodiment, the terminal 830 activating a Wi-Fi function may be connected to the EAP 820 via the Wi-Fi AP included in the EAP 820. According to an embodiment, the terminal 830 deactivating a Wi-Fi function may be connected to the EAP 820 via the entity for performing the SDR-MCT included in the EAP 820. According to an embodiment, the terminal 830 activating a Wi-Fi function may include the terminal 830 having the IMSI as the identifier or the terminal 830 deactivating a Wi-Fi function may include the terminal 830 having the ITSI as the identifier. Notably, the disclosure is not limited to the above described embodiments, and the EAP 820 may include at least one of the entity for performing the SDR-MCT or the Wi-Fi AP, and adaptively establish the connection based on the characteristics of the terminal 830. If the connection establishment of the EAP 820 and the terminal 830 is completed, the terminal 830, which resides out of the base station coverage but is included in the coverage of the EAP 820, may communicate with the EAP 820 which functions substantially the same as the base station.

In step 823, the AMF 810 may establish connections of terminals corresponding to the VUEs respectively, to the VUEs contained in the VDF connected with the AMF 810 via the SMF and the PCF. For example, if the VDF includes a first VUE and a second VUE, the ITSI terminal 830 may be connected to the first VUE via the entity which performs the SDR-MCT function, and the IMSI terminal 830 may be connected to the second VUE via the Wi-Fi AP. As described above, the VDF may include the VUEs corresponding to the terminals connected to the EAPs respectively, and the AMF 810 may establish connections for the terminal 810 and the VUEs.

Although not depicted in FIG. 8A, if the terminal 830 hands over between the EAPs connected via the X2' interface or if the availability and the willingness of the EAP 820 establishing the connection with the terminal 830 for servicing the terminal 830 are changed, the terminal 830 may further perform the following steps to establish a new connection with a target EAP. According to an embodiment, if the terminal 830 performs the handover, the SBPA scheme may be used. The SBPA scheme may, for example, refer to a scheme which applies the sparsity of multiple MIMO channels and allocates the same orthogonal pilots to non-overlapping terminals for the consistent data transmission based on the angle of arrival and the angular spread of a pilot signal received in the compressed sensing scheme. Hence, by performing the SBPA scheme, the terminal 830 may establish the new connection with the target EAP without being affected from the access contention with other terminals.

The terminal 830 may obtain consent for the handover from the target EAP and the connected AMF 810. According to an embodiment, the terminal 830 may transmit a measurement report to the connected EAP 820. The EAP 820 receiving the measurement report from the terminal 830 may identify the required handover of the terminal 830. According to an embodiment, if identifying the required handover of the terminal 830, the EAP 820 may notify the AMF 810 of terminal handover related information. Based on this, the AMF 810 may identify the terminal handover required between the EAPs, and transmit its consent. According to an embodiment, the EAP 820 connected with the terminal 830 may transmit the handover related information to the target EAP. According to an embodiment, the EAP 820 connected with the terminal 830 may transmit the handover related information to the target EAP via the logical X2' interface. If obtaining the consent from both the target EAP and the AMF 810, the terminal 830 may successfully establish the new connection with the target EAP. To perform the handover between different EAPs, the terminal 830 may apply the physical X2' interface between the existing EAP 820 and the target EAP, and use the VUEs contained in the VDF. For example, if the terminal 830 attempts the handover to the target EAP, the AMF 810 may control to connect the terminal 830 handing over to the VUE connected with the target EAP using the CP.

If the terminal 830 does not obtain the consent from at least one of the target EAP and the AMF 810, the AMF 810 may arrange a new EAP connection for servicing the terminal 830. Arranging the new EAP connection at the AMF 810 may be carried out by various embodiments of the present disclosure described earlier. According to an embodiment, as illustrated in FIG. 3, the connection establishment process between the new EAP, the terminal 830 and the core network (e.g., the AMF 810) may be conducted, to instantiate the cooperative transmission.

Figure 8B:
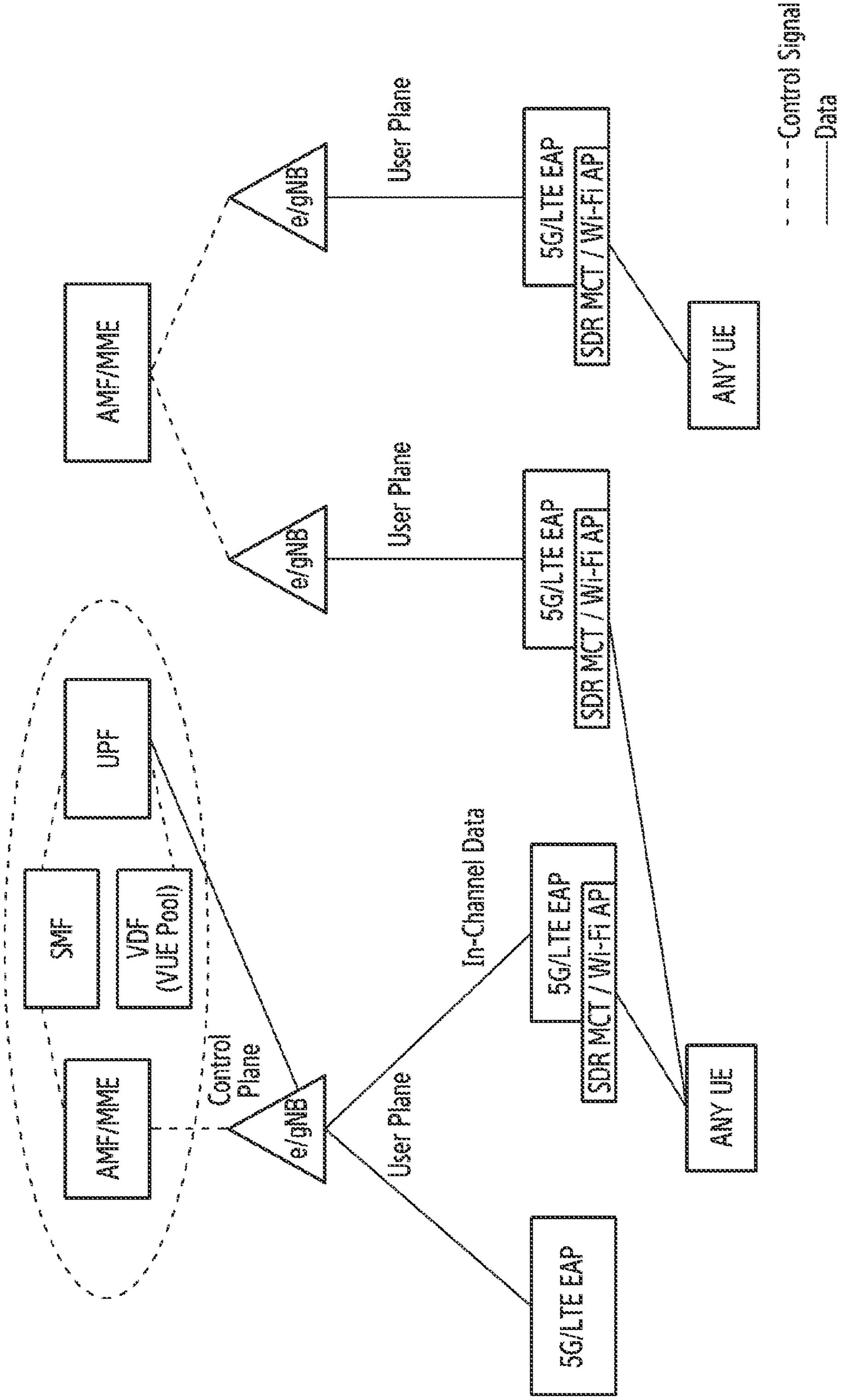
FIG. 8B illustrates an example network architecture for establishing a connection of an EAP and a UE if in-channel data is allowed according to various embodiments.

FIG. 8B illustrates an example network architecture for establishing a connection of an EAP and a terminal if in-channel data is allowed according to various embodiments of the present disclosure. Specifically, FIG. 8B illustrates an example network architecture for performing the operations shown in FIG. 8A.

Referring to FIG. 8B, the AMF may expand the CP to encompass EAPs residing in the range of the base station. Although not depicted in FIG. 8B, the EAP may transmit the EAP capability information to the AMF. In addition, the EAP may determine the willingness for servicing the terminal, and determine whether to activate the SDR-MCT.

According to an embodiment, the EAP may identify whether the in-channel data may be transmitted or received over the UP. According to an embodiment, the AMF may determine whether to activate the VDF to include the VUE pool including a plurality of VUEs. According to an embodiment, the AMF may create VUEs for the terminals respectively to be attempted for the connection establishment in the VDF pool. According to an embodiment, the AMF may ensure that data is looped back in the VDF including the VUEs which imitate physical connection end points. In addition, the AMF may control to execute the VUE in the CP. According to an embodiment, the base station connected with the AMF and the EAP may transmit and receive the in-channel data over the UP. According to an embodiment, the AMF may be connected to the VDF via the SMF and the PCF.

Although not depicted in FIG. 8B, according to an embodiment, the base station may establish the X2 interface with the base station on another cell. According to an embodiment, if not reaching the base station on the other cell, the base station may establish the dummy interface having itself as the end point. According to an embodiment, the AMF may establish the X2 interface with the EAP. According to an embodiment, the EAP may establish the logical X2' interface with another EAP.

According to an embodiment, the EAP may establish a connection with the terminal. According to an embodiment, the terminal may be attached to the EAP based on the instruction received from the AMF. According to an embodiment, the terminal activating a Wi-Fi function may be connected to the EAP via the Wi-Fi AP included in the EAP. According to an embodiment, the terminal deactivating a Wi-Fi function may be connected to the EAP via the entity for performing the SDR-MCT included in the EAP. According to an embodiment, the terminal activating a Wi-Fi function may include the terminal having the IMSI as the identifier or the terminal deactivating a Wi-Fi function may include the terminal having the ITSI as the identifier. Notably, the disclosure is not limited to the above described embodiments, and the EAP may include at least one of the entity for performing the SDR-MCT or the Wi-Fi AP, and adaptively establish the connection based on the characteristics of the terminal. If the connection establishment of the EAP and the terminal is completed, the terminal, which resides out of the base station coverage but is included in the coverage of the EAP, may communicate with the EAP which functions substantially the same as the base station.

According to an embodiment, if the terminal hands over between the EAPs connected via the X2' interface or if the availability and the willingness of the EAP establishing the connection with the terminal for servicing the terminal are changed, the terminal may further perform handover procedures to establish a new connection with the target EAP.

According to various example embodiments of the present disclosure, a method performed by an AMF in a wireless communication system may include receiving EAP capability related information from an EAP, performing control plane expansion to include the EAP, based on the received EAP capability related information, creating an X2 interface with the AMF and the EAP based on a number of relevant base stations, instructing the base station to establish an X2 interface with the EAP based on the created X2 interface, and instructing the EAP to establish a connection with a terminal.

According to an example embodiment, the method may further include, if handover of the terminal is required, receiving information related to the handover of the terminal from the EAP, and transmitting a consent message of the handover based on the handover related information of the terminal.

According to an example embodiment, the method may further include, if the EAP activates a VUE function, determining whether the EAP supports a dual full radio chain function, and admitting and registering the VUE.

According to an example embodiment, the method may further include, if the EAP supports piggyback over the control plane, determining whether to activate a VDF encompassing a plurality of VUEs, ensuring that a data signal is transmitted to the plurality of the VUEs, and establishing a connection of the terminal and at least one VUE of the plurality of the VUEs corresponding to the terminal.

According to an example embodiment, the method may further include, if the EAP transmits and receives in-channel data over a user plane, determining whether to activate a VDF encompassing a plurality of VUEs, ensuring that a data signal is looped back in the VDF embracing the plurality of the VUEs, the VDF connected to the AMF via a SMF and a UPF, and establishing a connection of the terminal and at least one VUE of the plurality of the VUEs corresponding to the terminal.

According to various example embodiments of the present disclosure, a method performed by an EAP in a wireless communication system may include transmitting EAP capability related information to an AMF, determining capability for servicing a terminal based on the EAP capability related information, determining whether to activate an SDR-MCT function to perform modulation or demodulation in software based on the EAP capability related information, establishing an X2 interface with a base station connected to the AMF, establishing a logical interface with another EAP in coverage of the base station, and establishing a connection with the terminal based on an instruction of the AMF.

According to an example embodiment, the method may further include receiving a measurement report from the terminal, identifying whether handover of the terminal is required, based on the measurement report, and if the handover of the terminal is required, transmitting handover related information of the terminal to the another EAP.

According to an example embodiment, the method may further include determining whether the EAP supports dual full radio chain capability, and activating a VUE function based on the dual full radio chain capability.

According to an example embodiment, the method may further include determining whether the EAP supports piggyback over a control plane, and performing a piggyback operation with the AMF over the control plane.

According to an example embodiment, the method may further include determining whether the EAP transmits and receives in-channel data over a user plane, and transmitting and receiving the in-channel data to and from the base station over the user plane.

According to various example embodiments of the present disclosure, an AMF in a wireless communication system may include at least one transceiver, and at least one processor functionally coupled with the at least one transceiver, and the at least one processor may be configured to receive EAP capability related information from an EAP, perform control plane expansion to include the EAP, based on the received EAP capability related information, create an X2 interface with the AMF and the EAP based on the number of relevant base stations, instruct the base station to establish the X2 interface with the EAP based on the created X2 interface, and instruct the EAP to establish a connection with a terminal.

According to an example embodiment, the at least one processor may be configured further to, if handover of the terminal is required, receive information related to the handover of the terminal from the EAP, and transmit a consent message of the handover based on the handover related information of the terminal.

According to an example embodiment, if the EAP activates a VUE function, the at least one processor may be configured further to determine whether the EAP supports a dual full radio chain function, and admit and register the VUE.

According to an example embodiment, if the EAP supports piggyback over a control plane, the at least one processor may be configured further to determine whether to activate a VDF encompassing a plurality of VUEs, ensure that a data signal is transmitted to the plurality of the VUEs, and establish a connection of the terminal and at least one VUE of the plurality of the VUEs corresponding to the terminal.

According to an example embodiment, if the EAP transmits and receives in-channel data over a user plane, the at least one processor may be configured further to determine whether to activate a VDF encompassing a plurality of VUEs, ensure that a data signal is looped back in the VDF embracing the plurality of the VUEs, the VDF connected to the AMF via an SMF and a UPF, and establish a connection of the terminal and at least one VUE of the plurality of the VUEs corresponding to the terminal.

According to various example embodiments of the present disclosure, an EAP in a wireless communication system may include at least one transceiver, and at least one processor functionally coupled with the at least one transceiver, and the at least one processor may be configured to transmit EAP capability related information to an AMF, determine capability for servicing a terminal based on the EAP capability related information, determine whether to activate an SDR-MCT function to perform modulation or demodulation in software based on the EAP capability related information, establish an X2 interface with a base station connected to the AMF, establish a logical interface with another EAP in coverage of the base station, and establish a connection with the terminal based on an instruction of the AMF.

According to an example embodiment, the at least one processor may be configured further to receive a measurement report from the terminal, identify whether handover of the terminal is required, based on the measurement report, and if the handover of the terminal is required, transmit handover related information of the terminal to the another EAP.

According to an example embodiment, the at least one processor may be configured further to determine whether the EAP supports dual full radio chain capability, and activate a VUE function based on the dual full radio chain capability.

According to an example embodiment, the at least one processor may be configured further to determine whether the EAP supports piggyback over a control plane, and perform a piggyback operation with the AMF over the control plane.

According to an example embodiment, the at least one processor may be configured further to determine whether the EAP transmits and receives in-channel data over a user plane, and transmit and receive the in-channel data to and from the base station over the user plane.

The methods according to the example embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific example embodiments of the present disclosure, the components included in the present disclosure are expressed in a singular or plural form. However, the singular or plural expression is appropriately selected according to a proposed situation for the convenience of explanation, and the present disclosure is not limited to a single component or a plurality of components. Thus, the components expressed in the plural form may be configured as a single component, and the components expressed in the singular form may be configured as a plurality of components.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by an access and mobility management function (AMF) entity, in a wireless communication system, the method comprising:

receiving, from an extended access point (EAP), information on an EAP capability;

performing control plane expansion to include the EAP, based on the information on the EAP capability;

creating an X2 interface based on a number of base stations associated with the AMF entity and the EAP;

transmitting, to a base station among the base stations, an indication indicating to establish the X2 interface with the EAP; and transmitting, to the EAP, an indication indicating to establish a connection with a terminal.

2. The method of claim 1, further comprising:

if handover of the terminal is required, receiving, from the EAP, information on the handover of the terminal; and transmitting a consent message of the handover based on the information on the handover.

3. The method of claim 2, wherein, if the EAP activates a virtual user equipment (VUE) function, the method further comprises:

determining whether the EAP supports a dual full radio chain function; and admitting and registering the VUE.

4. The method of claim 2, wherein, if the EAP supports piggyback over a control plane, the method further comprises:

determining whether to activate a virtual device function (VDF) comprising a plurality of VUEs;

ensuring that a data signal is transmitted to the plurality of the VUEs; and establishing a connection between the terminal and at least one VUE of the plurality of the VUEs corresponding to the terminal.

5. The method of claim 2, wherein, if the EAP transmits and receives in-channel data over a user plane, the method further comprises:

determining whether to activate a VDF comprising a plurality of VUEs;

ensuring that a data signal is looped back in the VDF comprising the plurality of the VUEs, wherein the VDF is connected to the AMF entity via a session management function (SMF) entity and a user plane function (UPF) entity; and establishing a connection between the terminal and at least one VUE of the plurality of the VUEs corresponding to the terminal.

6. A method performed by an extended access point (EAP), in a wireless communication system, the method comprising:

transmitting, to an access and mobility management function (AMF) entity, information on an EAP capability;

determining capability for servicing a terminal based on the information on the EAP capability;

determining whether to activate a software defined radio (SDR)-modulation & coding translation (MCT) function to perform modulation or demodulation in software based on the information on the EAP capability;

establishing an X2 interface with a base station connected to the AMF entity;

establishing a logical interface with another EAP in coverage of the base station; and establishing a connection with the terminal based on an indication from the AMF entity.

7. The method of claim 6, further comprising:

receiving, from the terminal, a measurement report;

identifying whether handover of the terminal is required, based on the measurement report; and if the handover of the terminal is required, transmitting, to the another EAP, information on the handover.

8. The method of claim 6, further comprising:

determining whether the EAP supports dual full radio chain capability; and activating a virtual user equipment (VUE) function based on the dual full radio chain capability.

9. The method of claim 6, further comprising:

determining whether the EAP supports piggyback over a control plane; and performing a piggyback operation with the AMF entity over the control plane.

10. The method of claim 6, further comprising:

determining whether the EAP transmits and receives in-channel data over a user plane;

transmitting, to the base station over the user plane, the in-channel data; and receiving, from the base station over the user plane, the in-channel data.

11. An access and mobility management function (AMF) entity, in a wireless communication system, comprising:

at least one processor; and at least one memory, communicatively coupled to the at least one processor, storing instructions executable by the at least one processor individually or in any combination to cause the AMF entity to:

receive, from an extended access point (EAP), information on an EAP capability, perform control plane expansion to include the EAP, based on the information on the EAP capability, create an X2 interface based on a number of base stations associated with the AMF entity and the EAP, transmit, to a base station among the base stations, an indication indicating to establish the X2 interface with the EAP, and transmit, to the EAP, an indication indicating to establish a connection with a terminal.

12. The AMF entity of claim 11, wherein the instructions further cause the AMF entity to:

if handover of the terminal is required, receive, from the EAP, information on the handover of the terminal, and transmit a consent message of the handover based on the information on the handover.

13. The AMF entity of claim 12, wherein, if the EAP activates a virtual user equipment (VUE) function, the instructions further cause the AMF entity to:

determine whether the EAP supports a dual full radio chain function, and admit and register the VUE.

14. The AMF entity of claim 12, wherein, if the EAP supports piggyback over a control plane, the instructions further cause the AMF entity to:

determine whether to activate a virtual device function (VDF) comprising a plurality of VUEs, ensure that a data signal is transmitted to the plurality of the VUEs, and establish a connection between the terminal and at least one VUE of the plurality of the VUEs corresponding to the terminal.

15. The AMF entity of claim 12, wherein, if the EAP transmits and receives in-channel data over a user plane, the instructions further cause the AMF entity to:

determine whether to activate a VDF comprising a plurality of VUEs, ensure that a data signal is looped back in the VDF comprising the plurality of the VUEs, wherein the VDF is connected to the AMF entity via a session management function (SMF) entity and a user plane function (UPF) entity, and establish a connection between the terminal and at least one VUE of the plurality of the VUEs corresponding to the terminal.

16. An extended access point (EAP) in a wireless communication system, comprising:

at least one processor; and at least one memory, communicatively coupled to the at least one processor, storing instructions executable by the at least one processor individually or in any combination to cause the EAP to:

transmit, to an access and mobility management function (AMF) entity, information on an EAP capability, determine capability for servicing a terminal based on the information on the EAP capability, determine whether to activate a software defined radio (SDR)-modulation & coding translation (MCT) function to perform modulation or demodulation in software based on the information on the EAP capability, establish an X2 interface with a base station connected to the AMF entity, establish a logical interface with another EAP in coverage of the base station, and establish a connection with the terminal based on an indication from the AMF entity.

17. The EAP of claim 16, wherein the instructions further cause the EAP to:

receive, from the terminal, a measurement report, identify whether handover of the terminal is required, based on the measurement report, and if the handover of the terminal is required, transmit, to the another EAP, information on the handover.

18. The EAP of claim 16, wherein the instructions further cause the EAP to:

determine whether the EAP supports dual full radio chain capability, and activate a virtual user equipment (VUE) function based on the dual full radio chain capability.

19. The EAP of claim 16, wherein the instructions further cause the EAP to:

determine whether the EAP supports piggyback over a control plane, and perform a piggyback operation with the AMF entity over the control plane.

20. The EAP of claim 16, wherein the instructions further cause the EAP to:

determine whether the EAP transmits and receives in-channel data over a user plane, transmit, to the base station over the user plane, the in-channel data, and receive, from the base station over the user plane, the in-channel data.

* * * * *